(12) United States Patent
Lemos et al.

(10) Patent No.: US 12,430,104 B2
(45) Date of Patent: Sep. 30, 2025

(54) DECLARATIVE VISUAL PROGRAMMING LANGUAGE CODE SEARCH

(71) Applicant: OutSystems-Software em Rede, S.A., Linda-A-Velha (PT)

(72) Inventors: Alexandre Duarte De Almeida Lemos, Lisbon (PT); Miguel Ângelo Da Terra Neves, Lisbon (PT); José Francisco Pires Amaral, Lisbon (PT); Pedro Tomás Mendes Resende, Lisbon (PT); Rui Dias Quintino, Oporto (PT); António Manuel De Carvalho Dos Santos Alegria, Lisbon (PT)

(73) Assignee: OutSystems-Software em Rede, S.A. (PT)

( * ) Notice: Subject to any disclaimer, the term of this patent is extended or adjusted under 35 U.S.C. 154(b) by 353 days.

(21) Appl. No.: 17/560,892

(22) Filed: Dec. 23, 2021

(65) Prior Publication Data
US 2023/0205496 A1    Jun. 29, 2023

(51) Int. Cl.
*G06F 8/34*    (2018.01)
(52) U.S. Cl.
CPC ..................... *G06F 8/34* (2013.01)
(58) Field of Classification Search
CPC .......................................................... G06F 8/34
USPC ......................................................... 717/109
See application file for complete search history.

(56) References Cited

U.S. PATENT DOCUMENTS

| | | | | |
|---|---|---|---|---|
| 8,666,999 | B2* | 3/2014 | Havel et al. | G06F 8/751 717/132 |
| 2010/0083240 | A1* | 4/2010 | Siman | G06F 8/433 717/144 |
| 2010/0269096 | A1* | 10/2010 | Araya et al. | G06F 8/75 717/144 |
| 2011/0078650 | A1* | 3/2011 | Weber et al. | G06Q 10/06 717/104 |
| 2013/0007701 | A1* | 1/2013 | Sundararam | G06F 8/30 717/109 |
| 2014/0208296 | A1* | 7/2014 | Dang et al. | G06F 8/751 717/123 |
| 2014/0337715 | A1* | 11/2014 | Madden | G06F 40/143 715/236 |
| 2016/0093232 | A1* | 3/2016 | Chong | G06F 8/436 434/118 |
| 2017/0060541 | A1* | 3/2017 | Saleh | G06F 8/34 |
| 2017/0235569 | A1* | 8/2017 | Sturtevant et al. | G06F 8/77 717/102 |

\* cited by examiner

*Primary Examiner* — Qing Chen
(74) *Attorney, Agent, or Firm* — Van Pelt, Yi & James LLP

(57) ABSTRACT

A declarative specification of a search pattern for a graph visual programming language code is received. A repository of graph based visual programming language code instances is analyzed using one or more processors to identify at least a portion of a visual programming language code instance of the repository that matches the search pattern. An indication of at least the portion of the visual programming language code instance of the repository that matches the search pattern is provided.

20 Claims, 17 Drawing Sheets

○ outsystems › Architecture Dashboard   Apps   Report   Overview   Maintenance   OutSystems (Demo) ▾ ⑦ ⌗ ⊞ ⓇⓆ Rui Quintino < Back to Apps
Report
Last sync was 7 hours ago. ⓘ                                                                                           [Export to Excel]

Apps              Modules            Category
[All apps ▾]      [All Modules ▾]    [All categories ▾]
Analyzed          Findings status    Category
[Any time ▾]      [All status ▾]     [All users ▾]

Code patterns                                             ordered by Technical debt ▾

| Inline JavaScript | Performance 3 |
| JavaScript or HTML injection | Security 1 |
| Inefficient empty list test | Performance 4 |
| Visible disabled Button | Security 1 |
| Delete Actions that could be bulked | Performance 2 › |
| Aggregates or SQL queries executed inside a loop | Performance 11 |
| Connected Aggregates that could be joined | Performance 8 |

Delete Actions that could be bulked
Delete entity actions used in a loop that could be replaced
by a bulk Delete operation.
Impact                                                  +
How to fix                                              +
Findings
☑ [Flow Preview] teModuleFact                   Opened ▸
☑   ○ DeleteModule_BinarySizeBootstrap          Opened ▸
      ↖ 220

FIG. 2B

DECLARATIVE VISUAL PROGRAMMING LANGUAGE CODE SEARCH

BACKGROUND OF THE INVENTION

Machine-assisted software development is an emerging field, and aims to enable developers to create executable computer programs without requiring coding language fluency or a high degree of domain knowledge. For example, developers can interact with a "low-code" or "no-code" software development tool embodied in a visual modeling environment to develop executable computer programs such as enterprise or consumer Web and mobile applications. Developers can design computer programs by interacting with a graphical user interface to visually model program functionality instead of manually writing code. Sometimes developers may desire to search for specific patterns in code instances. Thus, there is a need to assist developers in this regard.

BRIEF DESCRIPTION OF THE DRAWINGS

Various embodiments of the invention are disclosed in the following detailed description and the accompanying drawings.

FIGS. 2B and 2C illustrate an example user interface associated with the system of FIG. 2A.

DETAILED DESCRIPTION

Figure 1:
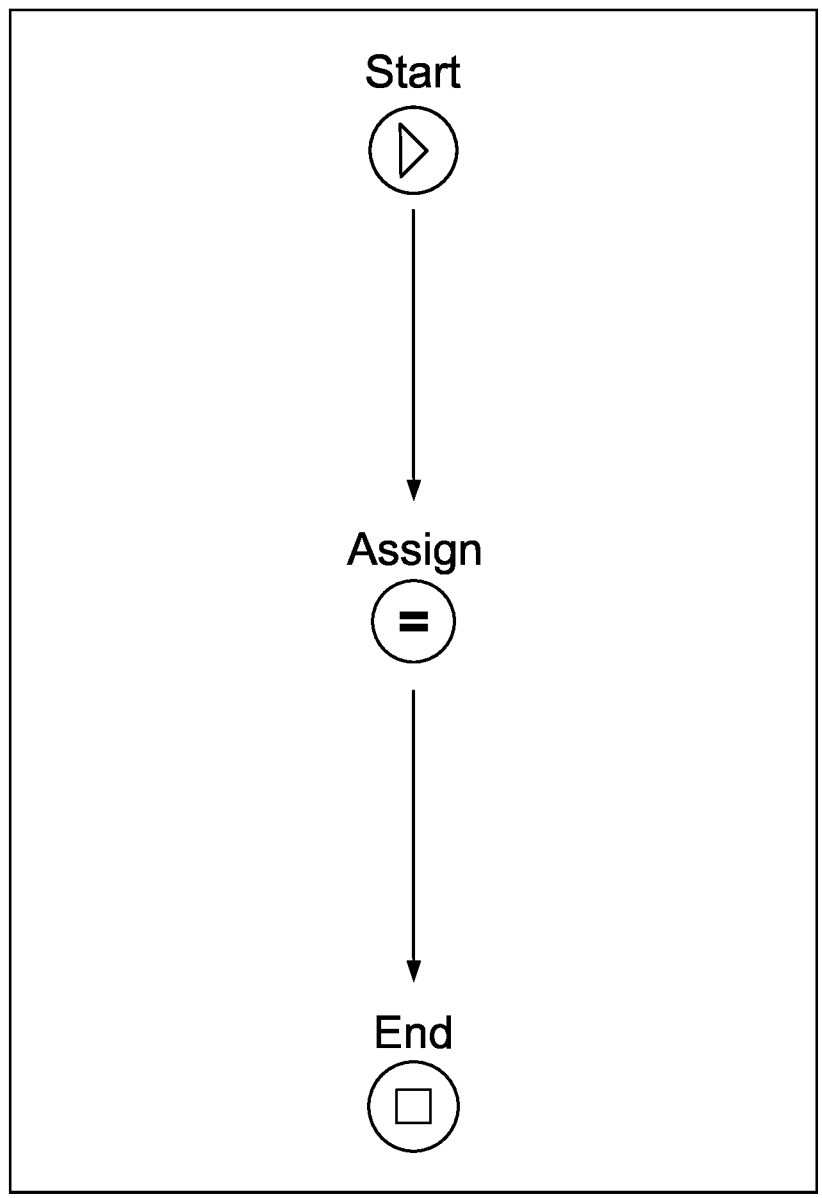
FIG. 1 shows an example of a visual programming language code instance.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Visual programming language code search is disclosed. A declarative specification of a search pattern for a graph visual programming language code is received. A repository of graph based visual programming language code instances is analyzed using one or more processors to identify at least a portion of a visual programming language code instance of the repository that matches the search pattern. An indication of at least the portion of the visual programming language code instance of the repository that matches the search pattern is provided. In various embodiments, code instances are matched in their entirety and at least a portion is indicated to a user.

In various embodiments, the disclosed techniques include a scalable code pattern search process that leverages the visual structure of visual programming languages to detect specified code patterns. The matching code may be highlighted (or more generally, visually distinguished from non-matching code) to explain the detected code. In a visual programming language, a computer program may be represented by a programmatic logic flow (sometimes also called "action flow", "logic flow", "visual flow", or simply "flow") made of nodes or steps. The disclosed techniques accurately and efficiently detect code instances by finding flows that match the given code pattern.

In some embodiments, the disclosed techniques identify instances of bad code. Bad code refers to computer code that does not follow standard conventions of computer programming, or code that is inefficient or that suffers from security vulnerabilities, and thus incurs technical debt. Technical debt refers to the cost of reworking or updating computer program code. Bad code may be poorly organized, difficult to understand, needlessly complex, difficult to debug, and difficult to scale up. In various embodiments, a bad code pattern (or any other code pattern) is defined declaratively in the sense that a pattern, instead of code to find the pattern, is specified. In various embodiments, the bad code pattern (or any other code pattern) is specified visually in the same visual programming language in which coding is performed, thereby leveraging the visual structure of the visual programming language for both code development and code pattern search. Search results can be aggregated and presented in any static analysis or code analysis tool such as an Integrated Development Environment (IDE) or Architecture Dashboard (or more generally an IDE such as Service Studio) by OutSystems® (e.g., to help guide refactoring of bad code).

FIG. 1 shows an example of a visual programming language code instance. Code instance 100 is a simple example of a flow in a visual programming language. The disclosed techniques can be applied to code instances such as code instance 100 to detect specified code patterns. Identified code patterns may be refactored. Refactoring refers to restructuring computer code so as to improve operation and maintainability without altering functionality. In the example illustrated, code instance 100 includes a start node, an assign node, and an end node. In various embodiments, start and end nodes, by convention, are common to all flows. Code instance 100 is merely illustrative and not intended to be limiting. Other code instances (as described below) are far more complex than a single action node between start and end nodes as illustrated in code instance 100. A more detailed explanation of flows as used in visual programming languages is presented below.

A flow is a directed weakly connected graph $G=(V, E)$ where each node in V has one of the following types: Start, End, Instruction, Loop, If or Switch. Additionally, each edge in E can be of type Connector, True, False, Cycle, Condition or Otherwise. The outgoing edges of a node are referred to as branches. G satisfies the following properties:

G does not contain self-loops or parallel edges.

V contains only one Start node v, and no edge $(u', v') \in E$ exists such that $v=v'$.

Given an End node $v \in V$, no branch exists in E for v and there exists at least one edge $(u', v') \in E$ such that $v=v'$.

A Start or Instruction node $u \in V$ has exactly one Connector branch $(u, v) \in E$.

An If node $u \in V$ has exactly one True branch $(u, v) \in E$ and one False branch $(u, v') \in E$.

A Loop node u E V has exactly one Connector branch $(u, v) \in E$ and one Cycle branch $(u, v') \in E$ such that there exists a path from u to itself through $(u, v')$.

A Switch node $u \in V$ has at least one Condition branch $(u, v) \in E$ and exactly one Otherwise branch $(u, v') \in E$.

A flow behaves like a control flow graph of a program written in a traditional programming language. Its execution begins at its Start node and terminates at one of its End nodes. Depending on their types, the nodes/edges can have different attributes. For example, an If (Loop) node includes a Boolean expression which dictates whether the execution is to continue through its True (Cycle) or False (Connector) branch. Similarly, a Condition branch of a Switch node includes a Boolean expression that, if evaluated to true, then execution continues through that branch. Condition branches also have a pre-specified order of evaluation. If none of those branches evaluate to true, then execution resumes through the Otherwise branch.

Figure 4:
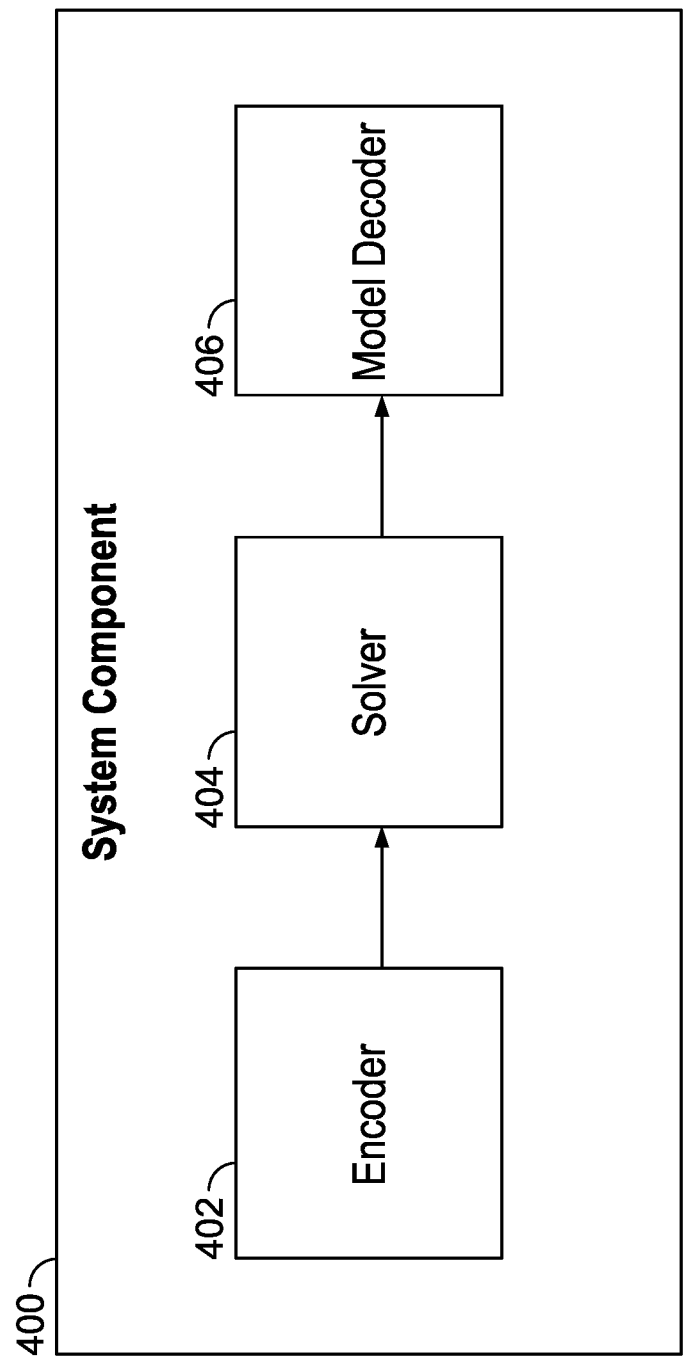
FIG. 4 is a block diagram illustrating an embodiment of a system component for analyzing code.

In some embodiments, instruction nodes correspond to functions/methods in text-based programming languages. These instruction nodes can be of various kinds, such as variable assignments, database accesses, calls to other logic flows, and so forth. Just like functions/methods in text-based programming languages, logic flows can have input and output parameters. Notwithstanding the above, the definition of a flow is a general one. Various classes of instruction nodes and various use cases (other than programming/coding) can occur. For example, instruction nodes may correspond to user interface elements or other types of data elements. Thus, in some embodiments, a pattern of user interface elements can be modeled as a flow. Any set of data elements can be connected to become a flow (in others words, a graph) with the data elements acting as nodes of the flow and the relationships among the data elements being edges. Stated alternatively, the techniques disclosed herein are generally applicable to any type of directed weakly connected graph $G=(V, E)$, regardless of what G represents. For example, wildcards (described in detail herein) are generally applicable to any type of node. Furthermore, the encoding described with respect to FIG. 4 is also generally applicable to graphs of any node type. This is because the encoding described with respect to FIG. 4 is based on mapping nodes and edges without regard to what the nodes and edges specifically represent. In order to illustrate at least one example fully and specifically, various descriptions herein are provided in the context of the programing/coding use case. However, other embodiments in which the nodes have different interpretations are also readily contemplated. For example, any reference to logic flows and/or nodes corresponding to computer programming elements (logic flows being code instances) also contemplates corresponding flows and/or nodes whose interpretation is a different use case (e.g., user interface elements or any general data pattern). Stated alternatively, with respect to the techniques disclosed herein, terms such as "logic flow", "visual flow", or "flow" can be regarded to generally refer to any declaratively specified graph $G=(V, E)$. Such graphs are also typically specified visually.

Figure 2A:
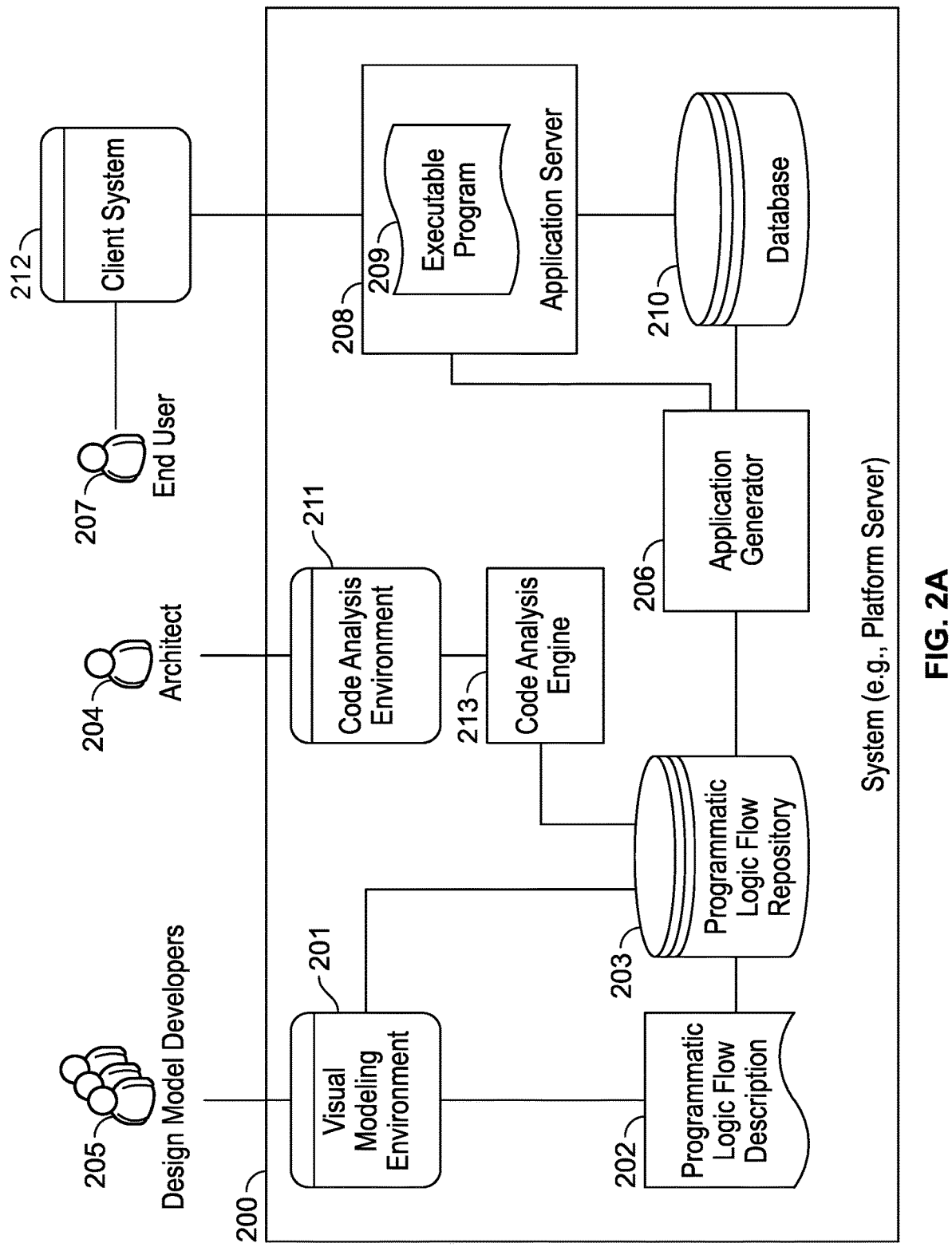
FIG. 2A is a block diagram illustrating an embodiment of a system for matching search patterns to visual programming language code instances.

FIG. 2A is a block diagram illustrating an embodiment of a system for matching search patterns to visual programming language code instances. System 200 includes visual modeling environment 201, programmatic logic flow repository 203, application generator 206, application server 208, database 210, and other components.

A design model developer 205, a user who is designated with the task of designing computer software design models, uses visual modeling environment 201 (e.g., Service Studio by OutSystems®) to edit, generate and modify programmatic logic flows using a graphical user interface. Visual modeling environment 201 facilitates the visual construction and modification of the programmatic logic flows in a user friendly and intuitive way. For example, visual modeling environment 201 may allow a user to visually select elements of a programmatic logic flow and connect them as desired. Visual modeling environment 201 can be a software program running on a developer's 205 device, or can be software running on a server (e.g., accessed via a browser), or some combination. In one implementation, visual modeling environment 201 is a combination of a software program running on a developer's computer and a set of software services running on a server being accessed by the modeling environment.

Programmatic logic flow description 202 describes, using abstractions, the intended behavior of a computer software system. Examples of the functionality provided by such computer software systems include: login verification, notification, database storage, order processing, electronic wallet, calendar/scheduler, directories, news and information, and so on. Using visual modeling environment 201, it is possible for a developer 205 to model distinct aspects of a computer software system, such as (a) the user navigation and user interface content to be presented to end-users; (b) the business rules that apply to the execution of the interactive events triggered by the end-user; and (c) the data transmission and data repository formats and relationships that support the execution of the application. These distinct aspects, in some implementations, can describe the intended behavior of the computer software system.

Code analysis engine 213 is configured to analyze code from programmatic logic flow repository 203. For example, probes may be set in various programmatic logic flows stored in programmatic logic flow repository 203. The code analysis engine analyzes (periodically or on demand) the code associated with the programmatic logic flows and outputs a set of patterns in flows in which they occur. An example of a pattern is an "if" statement followed by a loop. An example of a code analysis engine is CodeDNA by OutSystems®. In various embodiments, as described in further detail below (e.g., see FIG. 4), code analysis engine 213 includes components for matching code instances to search patterns through an encoding, solving, and decoding process.

A user such as architect 204 or developer 205 can access the analysis performed by the code analysis engine via code analysis environment 211. An example of a code analysis environment is an Architecture Dashboard by OutSystems®. Identified code patterns such as the example shown in FIG. 1 may be displayed within the code analysis environment. FIG. 2B shows an example of a user interface associated with viewing identified code pattern findings. The user interface includes various icons with which the user can interact. For example, selecting icon 220 of FIG. 2B triggers pop-up 230 of FIG. 2C, which shows a flow preview for a code pattern finding.

Once a programmatic logic flow is designed, it is compiled into programmatic logic flow description 202 to be submitted to programmatic logic flow repository 203. The visual representations of programmatic logic flows in visual modeling environment 201 are translated into structured representations used for processing by other components of system 200. Visual modeling environment 201 is responsible for creating a programmatic logic flow description 202 document from visual representations. Programmatic logic flow description 202 can be generated at various times, for example, when a developer triggers the submission of a programmatic logic flow to programmatic logic flow repository 203 or in response to developer interaction with the programmatic logic flow such as adding, removing, or modifying a step in the programmatic logic flow.

In one embodiment, programmatic logic flow description 202 is structured using XML (Extensible Markup Language). XML is a language that can be used to describe information, or to make information self-describing, and which can facilitate mapping of visual models into a structured representation that can be parsed by other components of system 200.

Programmatic logic flow repository 203 stores the programmatic logic flow descriptions 202. By storing versions as development progresses, the repository retains information about how and when a programmatic logic flow changed over time. At any point in time, an authorized developer 205 can add a new version of a programmatic logic flow to programmatic logic flow repository 203. Additionally, programmatic logic flow repository 203 is integrated with visual modeling environment 201 to support collaboration among concurrent developers 205. In the simplest case, one single developer 205 adds revised versions of a programmatic logic flow to programmatic logic flow repository 203. In more complex implementations, multiple developers 205 retrieve and add distinct versions of a programmatic logic flow to and from programmatic logic flow repository 203. After completing a first version of a programmatic logic flow, the programmatic logic flow can continue to be developed.

Programmatic logic flow repository 203 may be based on a database server such as Microsoft® SQL Server, Amazon® AWS Database, Oracle® Database and accessed via software services hosted in an application server system. These software services provide visual modeling environment 201 means to submit and retrieve programmatic logic flows as well as to submit and retrieve information about programmatic logic flow repository 203 content.

In the context of system 200, application generator 206 may be used to translate programmatic logic flows into an implementation of a computer software system. An implemented computer software system may include executable program 209 to run in application server 208 and a database definition to be hosted in a relational database system 210. The user navigation and user interface aspects, as well as the business rule and data transmission aspects of the model, are translated into executable program 209. The executable program can be any executable or interpreted program, for example a web application targeting the .NET® platform from Microsoft®, Java/Jakarta Enterprise Edition (JEE) platform available from Oracle®, or various PHP-based platforms.

The data repository aspects of the computer software system are translated into database 210. The database can be any sort of relational database. The generated executable program 209 may be automatically configured to access database 210 according to the programmatic logic flow.

Once executable program 209 and database 210 are available on system 200, application server 208 can handle requests from end users 207 via client system 212, which can be, for example, a Hyper Text Transfer Protocol (HTTP) client, a mobile client, a Web Browser, a backend system, etc. This means that the elements in the model that denote the way end users see and interact with the computer software system are generated as code, for example Web pages that are hosted in application server 208 and served via HTTP to client system 212. A request generates a response that is sent back to client system 212, which may take the form of a graphical user interface to be displayed to end user 207. Some controls embedded in the graphical user interface may react to subsequent user generated events and cause the browser to generate subsequent requests back to application server 208. For example, when a user presses a button visible in client system 212, a form may be submitted to application server 208 that in response provides the content of a new interactive form to client system 212.

The work product (e.g., modules) generated by the programmatic logic flow development process can be stored in a shared library of reusable modules. In various embodiments, anonymized data models and business logic patterns and/or models/patterns can be imported from third party systems. Examples of anonymized data include: 1) source code for cloud customers' software, which indicates how software is created, 2) requirements, user stories, support tickets, or the like, which specify what the user wants, 3) error logs, which can be analyzed to determine what went wrong with the developed software, 4) performance analytics data, which indicates factors that impact processing speed/latency and what is fast/slow, 5) end user satisfaction and feedback data, which indicates what works well and what does not work well, 6) integrated development environment (IDE) telemetry data, which indicates how developers create software, and 7) user interface mockups and final artifacts, which specify how a user wants an application or program to look.

Figure 2C:
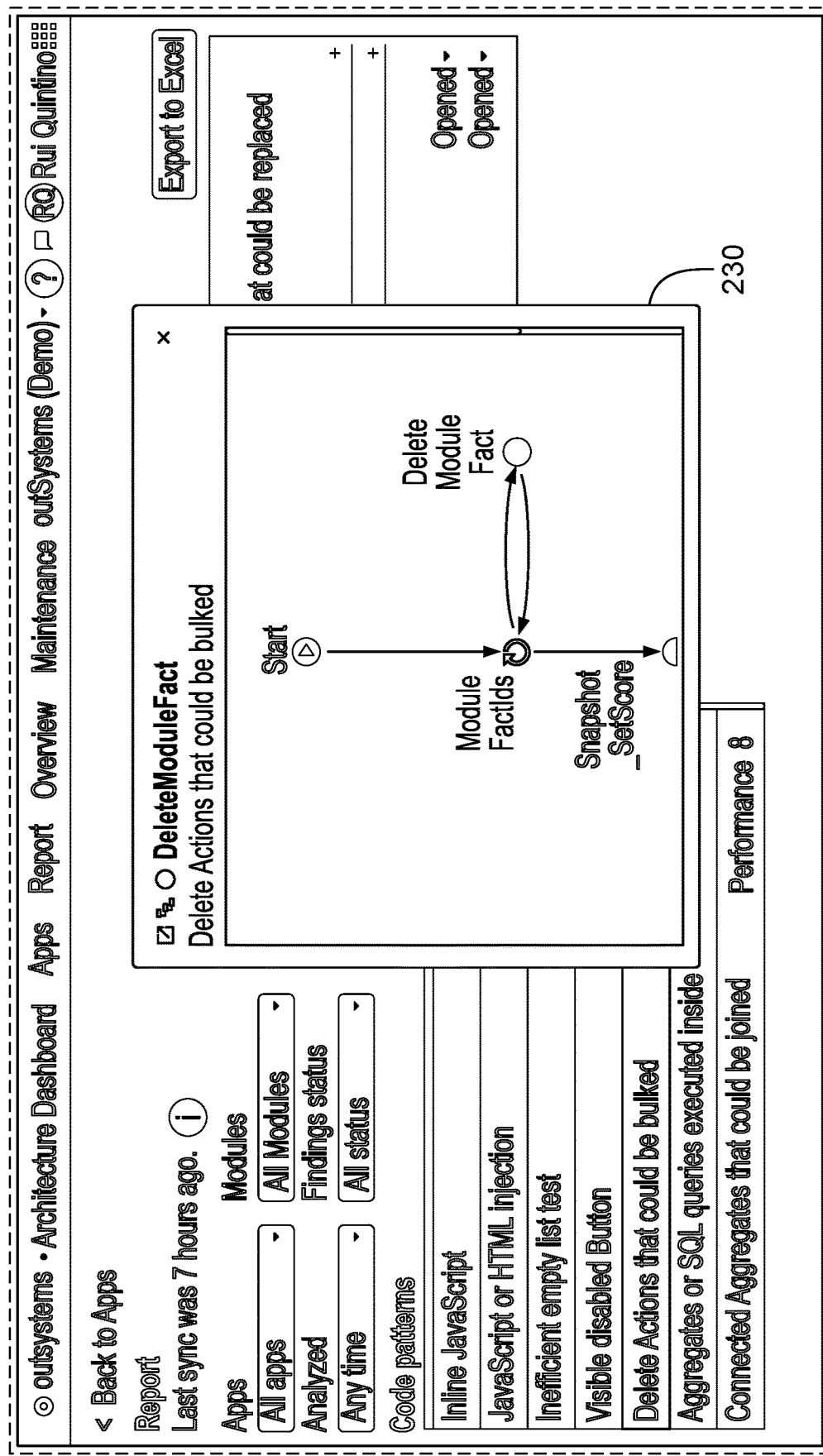

FIGS. 2B and 2C illustrate an example user interface associated with the system of FIG. 2A. FIGS. 2B and 2C are described above.

FIGS. 3A-3F show examples of wildcard search patterns and corresponding examples of matching code instances. Wildcard patterns are important components of generating visual programming language search patterns. As described below, various different types of wildcards may be utilized, e.g., any single node, any sequence of one or more nodes, any sequence of zero or more nodes, any subgraph of one or more nodes, any subgraph of zero or more nodes, and so forth.

Figure 3A:
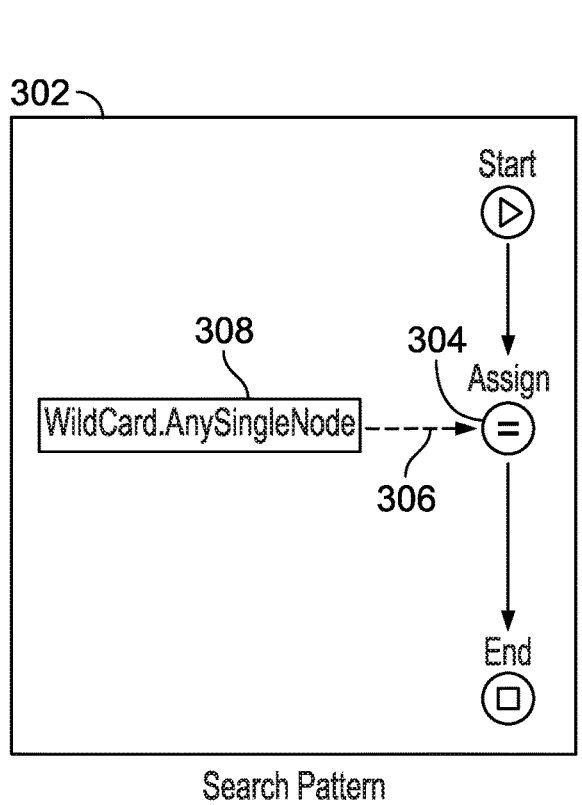
FIGS. 3A-3F show examples of wildcard search patterns and corresponding examples of matching code instances.
Figure 3A:
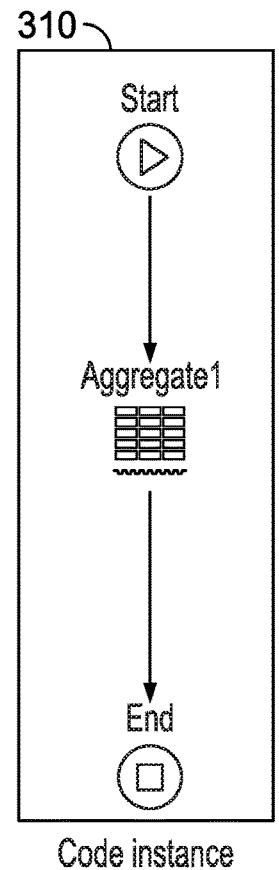

FIG. 3A illustrates an any single node wildcard search pattern. In the example shown, search pattern 302 includes a logic flow that includes start and end nodes and a single action node 304. Node 304 is visually represented as a wildcard node by edge 306 and comment node 308. For this example and the various other search patterns described herein, a pattern placeholder is represented as an edge with a comment node, with the text in the comment node indicating the type of pattern placeholder. In the example illustrated, the text in comment node 308 indicates the type of wildcard (in this case, an any single node wildcard). In various embodiments, search pattern 302 (and any other search pattern) is specified visually. In various embodiments, the same visual modeling environment that is used to specify logic flows of code instances is used to specify search patterns. In some embodiments, visual modeling environment 201 of FIG. 2A is utilized to specify search pattern 302 (and any other search pattern), e.g., by placing the included logic flow with start and end nodes, node 304, edge 306, and comment node 308. The text of comment node 308 can be typed directly into comment node 308, selected from a list, selected from a menu, etc. to define node 304 as an any single node wildcard. Code instance 310 is an example of a programmatic logic flow that is matched using search pattern 302. Code instance 310 matches search pattern 302 because it comprises a single node between a start node and an end node, which is what search pattern 302 specifies. In various embodiments, code instance 310 is created using the same visual modeling environment (e.g., visual modeling environment 201 of FIG. 2A) used to create search pattern 302.

Figure 3B:
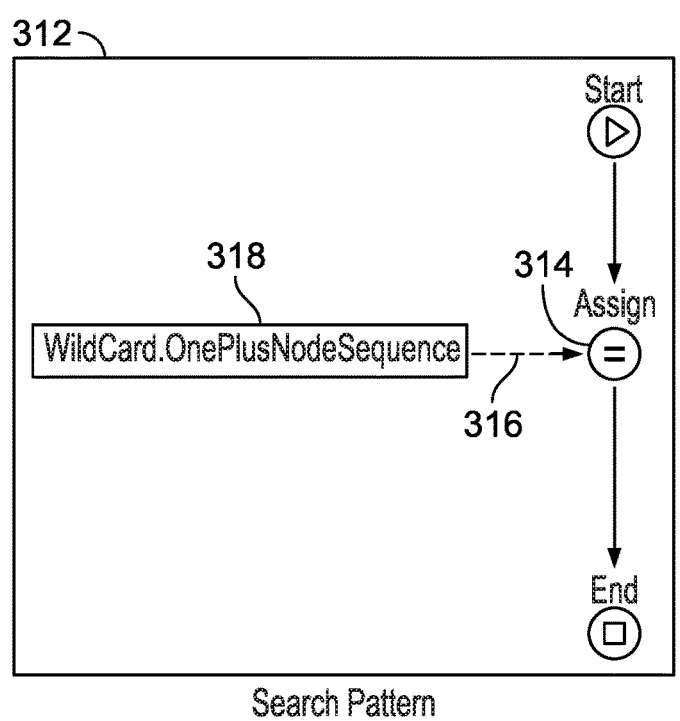
Figure 3B:
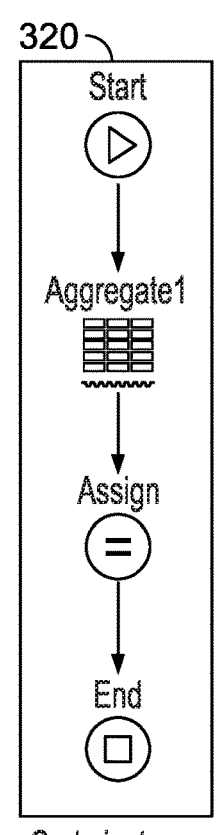

FIG. 3B illustrates a sequence of one or more nodes wildcard search pattern. This type of wildcard node represents a sequence of nodes. For example, it can be utilized to match a sequence with at least one node (of an unspecified sequence length). In the example illustrated, in search pattern 312, comment node 318 is connected via edge 316 to node 314. The text in comment node 318 indicates node 314 is a sequence of one or more nodes wildcard node. Code instance 320 is an example of a programmatic logic flow that is matched using search pattern 312. Code instance 320 matches search pattern 312 because it comprises a sequence of at least one node between a start node and an end node, which is what search pattern 312 specifies. In the specific case of code instance 320, there is a sequence of two nodes between start and end nodes.

Figure 3C:
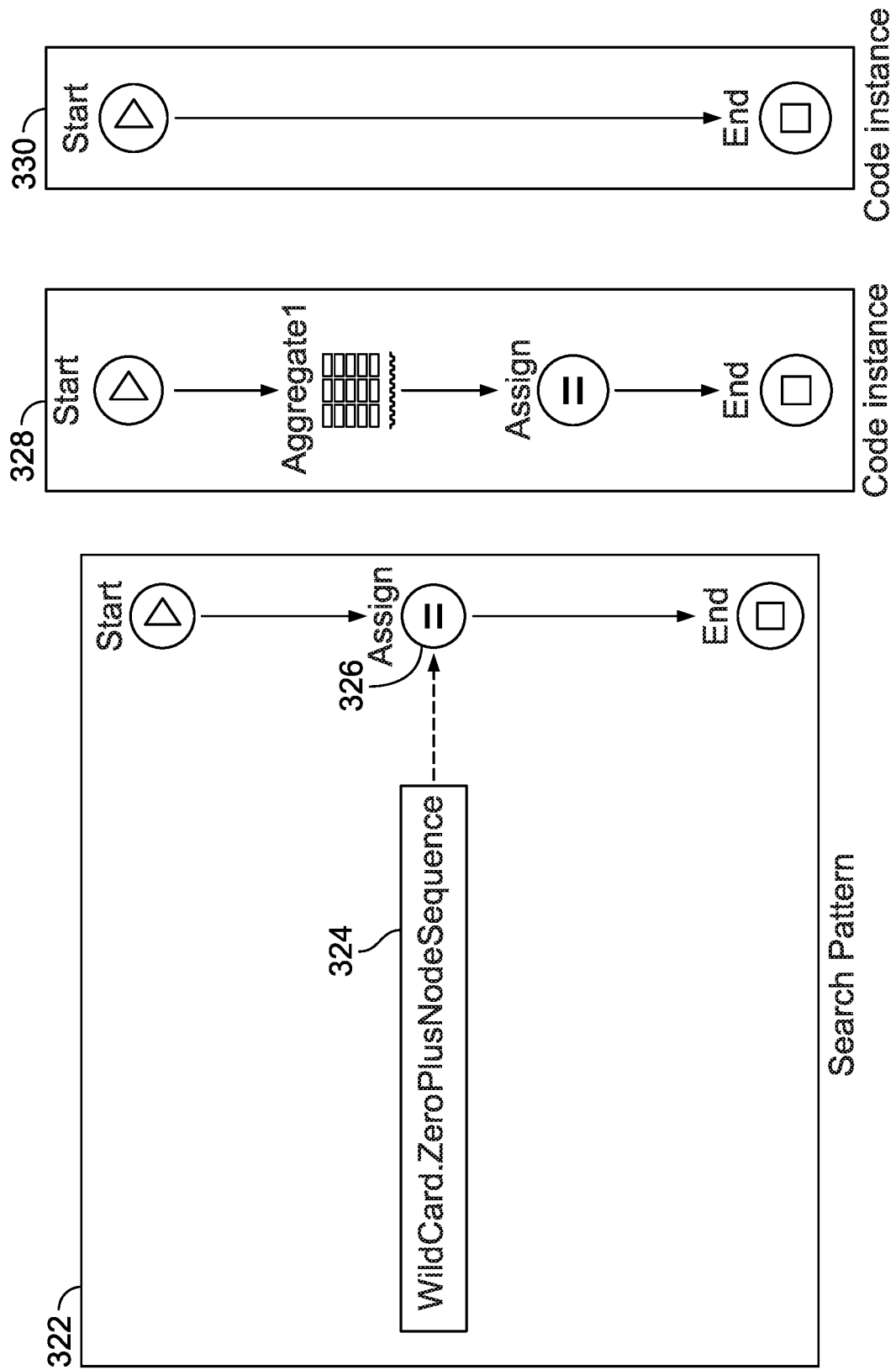

FIG. 3C illustrates a sequence of zero or more nodes wildcard search pattern. This type of wildcard node represents a sequence of any number of nodes. Search pattern 322 is the same as search pattern 312 except that the text in comment node 324 is different from the text in comment node 318. In the example illustrated, the text in comment node 324 indicates node 326 is a placeholder for a sequence of any number of (including zero) nodes. Code instance 328 (the same as code instance 320) is an example of a programmatic logic flow that is matched using search pattern 322. Code instance 330 is also a match event even though it is simply a start node and an end node because a sequence of zero nodes is between the start node and the end node, which is what search pattern 322 encompasses.

Figure 3D:
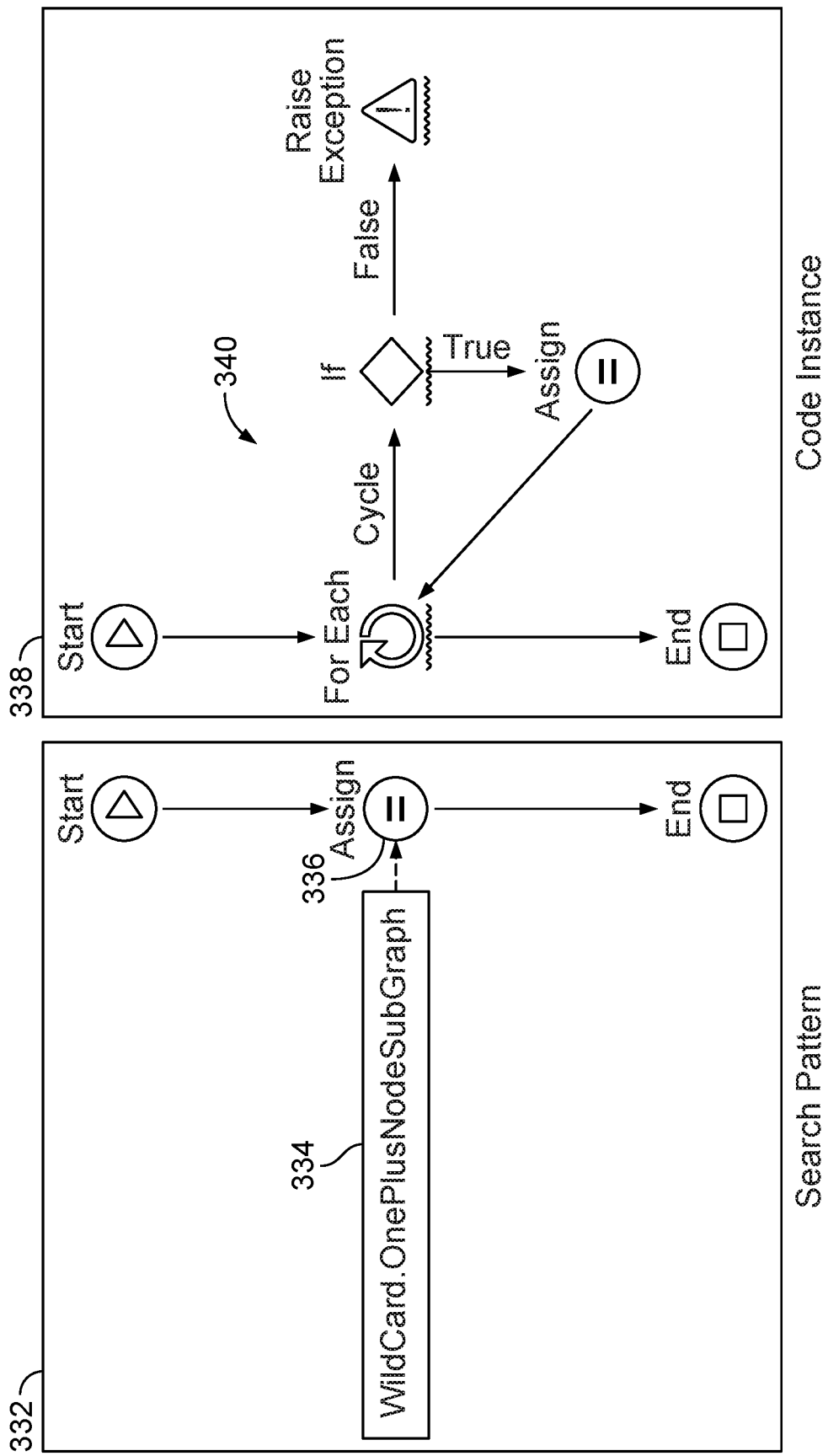

FIG. 3D illustrates a subgraph of one or more nodes wildcard search pattern. This type of wildcard is similar to the sequence of one or more nodes wildcard except that a subgraph, which can include loops, is covered instead of a straight sequence (train of nodes). In the example illustrated for search pattern 332, the text in comment node 334 indicates node 336 is a placeholder for a subgraph of one or more nodes. Code instance 338 is an example of a programmatic logic flow that is matched using search pattern 332 because it includes a subgraph of one or more nodes between a start node and an end node. Specifically, in code instance 338, subgraph 340 has four nodes, including "ForEach", "If", and "Assign" nodes that form a loop.

Figure 3E:
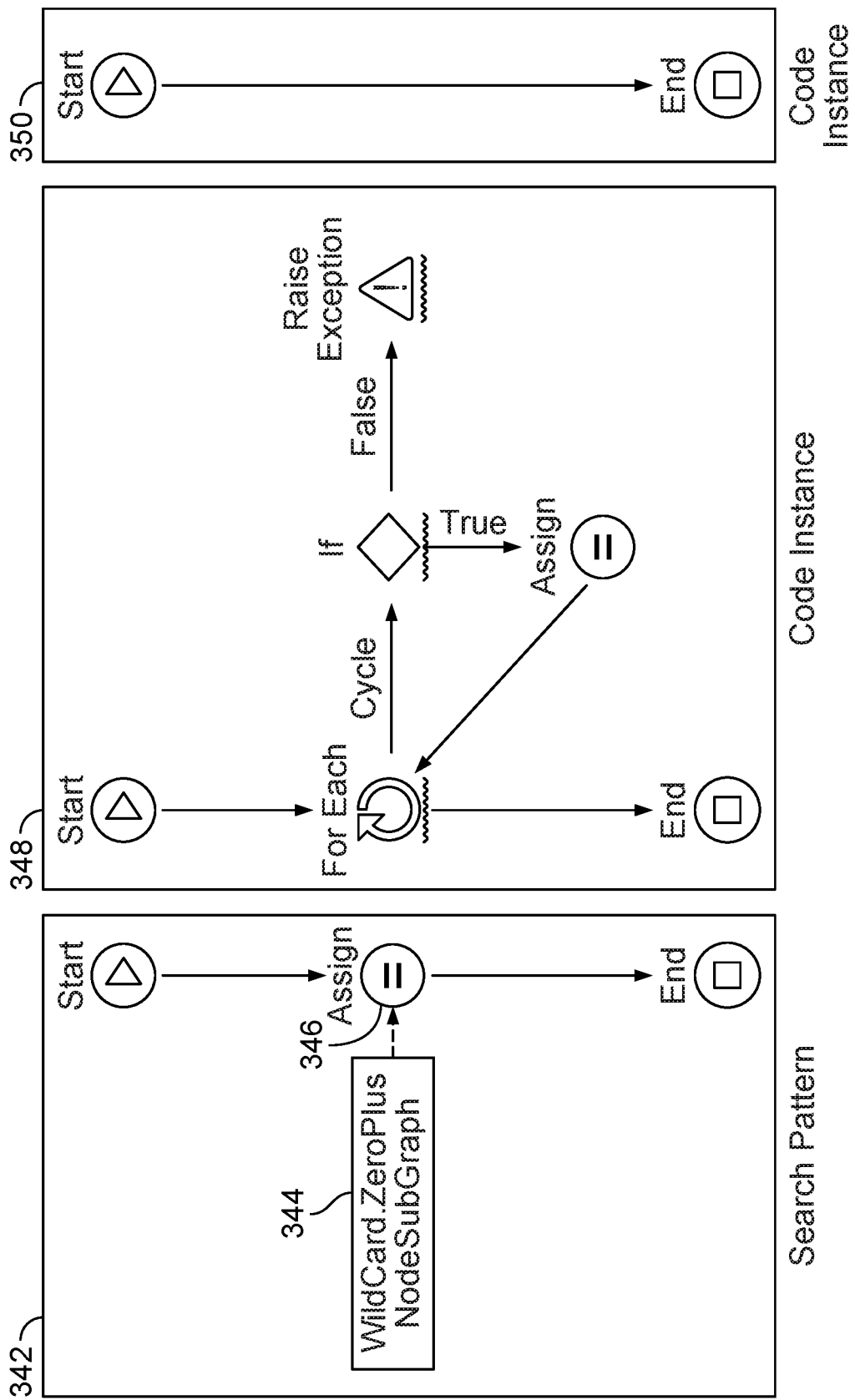

FIG. 3E illustrates a subgraph of zero or more nodes wildcard search pattern. This type of wildcard is similar to the sequence of zero or more nodes wildcard except that a subgraph, which can include loops, is covered instead of a straight sequence (train of nodes). This type of wildcard is also similar to the subgraph of one or more nodes wildcard except that a subgraph of zero nodes is also covered. In the example illustrated, for search pattern 342, the text in comment node 344 indicates node 346 is a placeholder of a subgraph of any number of (including zero) nodes. Code instance 348 (the same as code instance 338) is an example of a programmatic logic flow that is matched using search pattern 342. Code instance 350 is also a match event even though it is simply a start node and an end node because a subgraph of zero nodes is between the start node and the end node, which is what search pattern 342 encompasses.

Various other types of wildcards are also possible. An example is a node subset wildcard type that chooses a specific subset of possible nodes that the wildcard can match. For example, with the node subset wildcard type, it is possible to represent a scenario where either an assign node or an aggregate node (but no other nodes) can appear in the flow. Another example of another wildcard type is an any of kind wildcard type that only considers the kinds of the nodes instead of their labels. For example, two wildcards of this type in the same flow could match two aggregates of different sources. It is also possible to have an optional wildcard type that represents the possibility of having or not having a node in the flow. Stated alternatively, the optional wildcard makes it possible to have an optional node in a logic flow. It is also possible to have a range wildcard type that is similar to a sequence of nodes wildcard except that it is possible to specify a range of nodes to match (e.g., match sequences of two to four nodes).

Figure 3F:
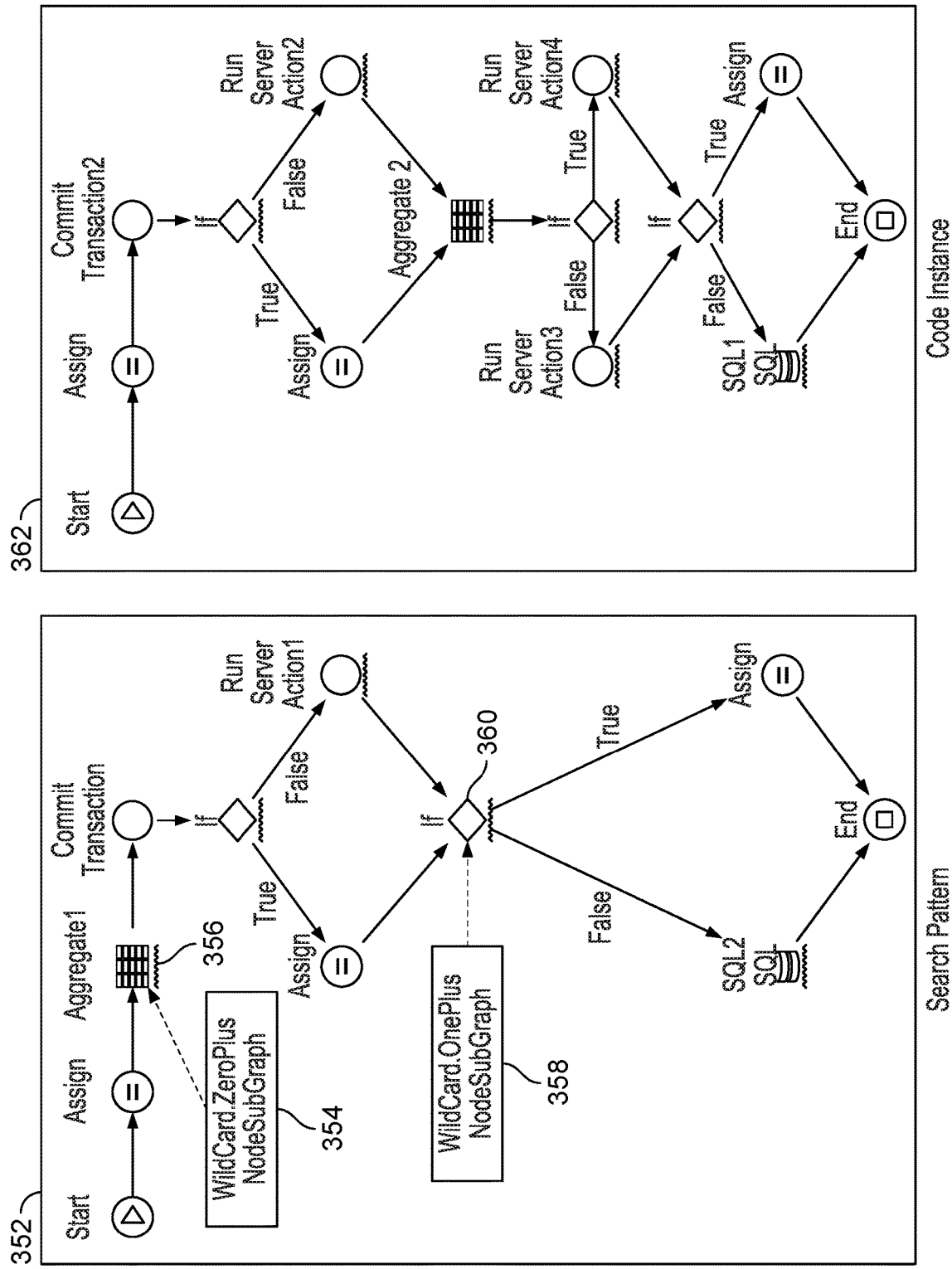

FIG. 3F illustrates a search pattern in which multiple wildcard types are utilized in the same search pattern. Utilizing multiple wildcards and/or multiple wildcard types in a single search pattern allows for more complex patterns to be searched (and thus more complex code instances to be matched). In search pattern 352, comment node 354 indicates node 356 is a subgraph of zero or more nodes wildcard, and comment node 358 indicates node 360 is a subgraph of one or more nodes wildcard. Code instance 362 is an example of a programmatic logic flow that is matched using search pattern 352. The top portion of search pattern 352 that includes node 356 is matched because node 356 matches to a subgraph of zero nodes in code instance 362. In addition, node 360 matches to a subgraph in code instance 362 that includes five nodes ("Aggregate2", "RunServerAction3", a first "If" node, "RunServerAction4", and a second "If" node).

FIG. 4 is a block diagram illustrating an embodiment of a system component for analyzing code. In some embodiments, system component 400 is included in code analysis engine 213 of FIG. 2A. System component 400 includes encoder 402, solver 404, and model decoder 406. System component 400 is configured to determine whether a flow matches a code pattern. The identification can be reduced to a Boolean satisfiability problem.

In some embodiments, encoder 402 is a Boolean satisfiability (SAT) encoder. In various embodiments, encoder 402 receives a logic flow (code instance to examine, $G_f$) and a code pattern (search pattern, $G_p$), constructs a set of constraints, and outputs a SAT formula. In various embodiments, solver 404 receives the SAT formula and outputs a model that corresponds to an assignment of variables that satisfies the constraints of the SAT formula. In various embodiments, model decoder 406 receives the model from solver 404 and outputs a binary decision as to whether the code pattern matches the logic flow. It is also possible for solver 404 to directly output this binary decision and not use a decoder. As described below, the logic flow (code instance to be matched) corresponds to $G_f$ and the code pattern (search pattern) corresponds to $G_p$. An example code pattern matching formulation is described below.

Code pattern matching is performed by mapping the nodes and edges of the logic flow $G_f=(V_f, E_f)$ into the nodes and edges of the code pattern $G_p=(V_p,E_p)$. A node constraint $\phi_{v_p}$ is associated with each node $v_p \in V_p$. This constraint dictates which nodes of $V_f$ can be mapped to $v_p$. Given a node $v_f \in V_f$, we use $\phi_{v_p}(v_f)=1$ to denote that $v_p$ matches $v_f$, i.e., $v_f$ can be mapped to $v_p$. On the other hand, if $\phi_{v_p}(v_f)=0$, then $v_f$ cannot be mapped to $v_p$. Analogously, an edge constraint $\phi_{(u_p,v_p)}$ is associated with each edge $(u_p, v_p) \in E_p$. An edge $(u_f, v_f) \in E_f$ can be mapped to $(u_p, v_p)$ if and only if $\phi_{u_p}(v_f)=1$, $\phi_{v_p}(v_f)=1$, and $\phi_{(u_p, v_p)}((u_f, v_f))=1$. Lastly, a node pair relation constraint $\psi_{u_p,v_p}$ is associated with each node pair $u_p, v_p \in V_p$ such that $u_p \neq v_q$. A pair of nodes $u_f, v_f \in V_f$ can be mapped to $u_p$ and $v_p$ respectively only if $\psi_{u_p, v_p}(u_f, v_f)=1$. Note the existence of a node pair relation constraint between $u_p$ and $v_p$ does not imply that the edge $(u_p, v_p)$ exists.

This approach reduces the problem of computing a mapping of the nodes and edges of $G_f$ to those of $G_p$ to an instance of Boolean Satisfiability (SAT). Directly below, the special case where $G_p$ does not include wildcard nodes is considered (wildcard nodes are considered further below) and an encoding for deciding if $G_p$ matches $G_f$, i.e., if there exists a bijective mapping of nodes and edges of $G_f$ to the nodes and edges of $G_p$, is presented.

For ease of explanation, some constraints are shown as at-most-1 constraints, i.e., of the form $\Sigma_i l_i \leq 1$, instead of clauses. Note that these can be easily converted to Conjunctive Normal Form (CNF) by introducing the clause $\neg l_i \vee \neg l_j$ for each pair i,j such that i≠j, or by using one of many CNF encodings for at-most-1 constraints available in the literature.

The following three sets of Boolean variables are considered:

Inclusion variables. For each node $v \in V_p$, a variable $u_v$ is introduced to encode if v is included in the mapping, i.e., if there exists a node in $V_f$ mapped to v (i.e., $u_v=1$) or not (i.e., $u_v=0$).

Mapping variables. For each node pair $v_p$, $v_f$ such that $v_p \in V_p$ and $v_f \in V_f$, a variable $m_{v_p,v_f}$ is introduced to encode if $v_f$ is mapped to $v_p$ (i.e., $m_{v_p,v_f}=1$) or not (i.e., $m_{v_p,v_f}=0$).

Control-flow variables. For each edge $(u_p, v_p) \in E_p$, a variable $c_{u_p,v_p}$ is introduced to encode if $(u_p, v_p)$ is included in the mapping, i.e., if there exists an edge in $E_f$ mapped to $(u_p, v_p)$ (i.e., $c_{u_p,v_p}=1$) or not (i.e., $c_{u_p,v_p}=0$).

The SAT formula has the following clauses:

Inclusion clauses. A node $v \in V_p$ is in the mapping if and only if at least one node in $V_f$ is mapped to $v_p$:

$$\bigwedge_{v_p \in V_p} \left[ \left( \neg o_{v_p} \vee \bigvee_{v_f \in V_f} m_{v_p,v_f} \right) \wedge \bigwedge_{v_f \in V_f} \left( o_{v_p} \vee \neg m_{v_p,v_f} \right) \right]. \quad \text{(Equation 1)}$$

One-to-one clauses. At most one node in $V_f$ can be mapped to each node $v \in V_p$:

$$\bigwedge_{v_p \in V_p} \left( \sum_{v_f \in V_f} m_{v_p,v_f} \leq 1 \right). \quad \text{(Equation 2)}$$

Function property clauses. Each node $v_f \in V_f$ cannot be mapped to more than one node in $V_p$:

$$\bigwedge_{v_f \in V_f} \left( \sum_{v_p \in V_p} m_{v_p,v_f} \leq 1 \right). \quad \text{(Equation 3)}$$

Node constraint consistency clauses. A node $v_f \in V_f$ cannot be mapped to $v \in V_p$ if $\phi_{v_p}(v_f)=0$:

$$\bigwedge_{v_p \in V_p} \bigwedge_{\substack{v_f \in V_f \\ \phi_{v_p}(v_f)=0}} \left( \neg m_{v_p,v_f} \right). \quad \text{(Equation 4)}$$

Control-flow consistency clauses. Consider some edge $(u_p, v_p) \in E_p$ and a pair of nodes $u_f, v_f \in V_f$. If $u_f$ and $v_f$ are mapped to $u_p$ and $v_p$, respectively, and $(u_f, v_f)$ is not an edge of $G_f$ or $\phi_{(u_p,v_p)}((u_f, v_f))=0$, then $(u_p, v_p)$ cannot be in the mapping:

$$\bigwedge_{(u_p,v_p) \in E_p} \bigwedge_{\substack{(u_f,v_f) \in V_f \times V_f \\ \phi_{(u_p,v_p)}((u_f,v_f))=0}} \left( \neg m_{u_p,u_f} \vee \neg m_{v_p,v_f} \vee \neg c_{u_p,v_p} \right). \quad \text{(Equation 5)}$$

Node pair relation constraint consistency clauses. For each node pair $(u_p, v_p) \in V_p \times V_p$ such that $u_p \neq v_p$, if a node $u_f \in V_f$ is mapped to $u_p$, then another $v_f \in V_f$ can be mapped to $v_p$ only if $\psi_{u_p, v_p}(u_f, v_f)=1$:

$$\bigwedge_{\substack{(u_p,v_p) \in V_p \times V_p \\ u_p \neq v_p}} \bigwedge_{u_f \in V_f} \left( \neg m_{u_p,u_f} \vee \bigvee_{\substack{v_f \in V_f \\ u_f \neq v_f \wedge \psi_{u_p,v_p}(u_f,v_f)=1}} m_{v_p,v_f} \right). \quad \text{(Equation 6)}$$

No spurious edge clauses. An edge $(u, v) \in E_p$ can be in the mapping only if both u and v are as well:

$$\bigwedge_{(u,v) \in E_p} \left[ (\neg c_{u,v} \vee o_u) \wedge (\neg c_{u,v} \vee o_v) \right]. \quad \text{(Equation 7)}$$

Node isomorphism clauses. Each node $v_p \in V_p$ must be in the mapping and each node $v_f \in V_f$ must be mapped to some node in $V_p$:

$$\bigwedge_{v_p \in V_p} (o_{v_p}) \wedge \bigwedge_{v_f \in V_f} \left( \bigvee_{v_p \in V_p} m_{v_p,v_f} \right). \quad \text{(Equation 8)}$$

Edge isomorphism clauses. Each edge $(u_p, v_p) \in E_p$ must be in the mapping and, for every edge $(u_f, v_f) \in E_f$, $u_f$ and $v_f$ can only be mapped to nodes $u_p, v_p \in V_p$, respectively, such that $(u_p, v_p)$ is an edge in $E_p$ that matches $(u_f, v_f)$ (i.e., $\phi_{(u_p,v_p)}((u_f, v_f))=1$):

$$\bigwedge_{(u_p,v_p)\in E_p}(c_{u_p,v_p}) \wedge \quad \text{(Equation 9)}$$

$$\bigwedge_{\substack{(u_f,v_f)\in E_f \\ (u_p,v_p)\notin E_p \vee \phi_{(u_p,v_p)}((u_f,v_f))=0}} \bigwedge_{(u_p,v_p)\in V_p \times V_p} (\neg m_{u_p,u_f} \vee \neg m_{v_p,v_f}).$$

The above describes encoding without wildcards. Below, the different wildcard types are listed, as well as the respective changes required to the above encoding in order to support them.

Any single node: an any-single-node wildcard is a node $w \in V_p$ such that any node $v_f \in V_f$ can be mapped to w. Essentially, it is semantically equivalent to a node $v_p \in V_p$ such that $\phi_{v_p}(v):=1$, i.e., $\phi_{v_p}(v_f)=1$ for all nodes $v_f \in V_f$. Let $V_p^A \subseteq V_p$ be the set of all any-single-node wildcards in $V_p$. In order to support such wildcards, the nodes in $V_p^A$ must be excluded from the node constraint consistency clauses from Equation 4 as follows:

$$\bigwedge_{\substack{v_p \in V_p \setminus V_p^A \\ \phi_{v_p}(v_f)=0}} \bigwedge_{v_f \in V_f} (\neg m_{v_p,v_f}). \quad \text{(Equation 10)}$$

Sequence of one or more nodes: an any-1+-sequence wildcard is a node $w \in V_p$ that multiple nodes in $V_f$ can map to. Let $A_f \subseteq V_f$ be a subset of nodes in $V_f$. $A_f$ is said to be a sequence of one or more nodes, and thus all nodes in $A_f$ can be simultaneously mapped to w, if and only if the following conditions are satisfied:

$|A_f| \geq 1$.

There exists an ordering of $v_f^1 v_f^2 \ldots v_f^n$, $n=|A_f|$, of the nodes of $A_f$ such that:
For all $i \in \{1 \ldots n-1\}$, $(v_f^i, v_f^{i+1}) \in E_f$.
For all $i \in \{1 \ldots n-1\}$, there exists no $u_f \in V_f$ such that $u_f \neq v_f^{i+1}$ and $(v_f^i, u_f) \in E_f$.
For all $i \in \{2 \ldots n\}$, there exists no $u_f \in V_f$ such that $u_f \neq v_f^{i-1}$ and $(u_f, v_f^i) \in E_f$.

In order to support any-1+-sequence wildcards, each such wildcard $w \in V_p$ is first replaced by k any-single-node $w^1, w^2, \ldots w^k$, as well as k−1 edges, one for each pair $(w^i, w^{i+1})$ such that $i \in \{1 \ldots n-1\}$. The choice of value for k is discussed below. The edge constraint $\phi_{(w^i,w^{i+1})}$ for each such edge $(w^i, w^{i+1})$ is set to 1, i.e., any edge of $E_f$ can be mapped to $(w^i, w^{i+1})$. We use $V_p^E(w)=\{w^1, w^2, \ldots, w^k\}$ to denote the set of any-single-node wildcards added to replace w, and $E_p^{Emid}(w)=\{(w^1, w^2), (w^2, w^3), \ldots, (w^{k-1}, w^k)\}$ to denote the set of edges added between the nodes of $V_p^E(w)$. Each edge $(u_p, w) \in E_p$ is replaced by the edge $(u_p, w^1)$, and the respective edge constraint $\phi_{(u_p,w^1)}$ is set to $\phi_{(u_p,w)}$. We use $E_p^{Ein}(w)$ to denote the set of all edges added to replace each such edge $(u_p, w)$. Similarly, each edge $(w, v_p) \in E_p$ is replaced by k edges $(w^i, v^p)$, one for each $i \in \{1 \ldots k\}$. We use $E_p^{Eout}(w, v_p)$ to denote the set of all new edges added to replace $(w, v_p)$. Additionally, we use $S_p(w) \subseteq V_p$ to denote the set of all successor nodes of w in $G_p$, i.e., $S_p(w)=\{v \in V_p: (u, v) \in E_p \wedge u=w\}$, and $E_p^{Eout}(w)$ to denote the union of all sets $E_p^{Eout}(w, v_p)$ such that $v_p$ is a successor of w, i.e., $E_p^{Eout}(w)=\cup_{v_p \in S_p(w)} E_p^{Eout}(w, v_p)$. Lastly, we use $E_p^{Eall}$ to denote the set of all edges added to replace w, i.e., $E_p^{Eall}(w)=E_p^{Ein}(w) \cup E_p^{Emid}(w) \cup E_p^{Eout}(w)$.

Let $V_p^{S+} \subseteq V_p$ denote the subset of all any-1+-sequence wildcards in $V_p$, and $G_p^E=(V_p^E, E_p^E)$ denote the graph that results from applying the aforementioned expansion to the nodes in $V_p^{S+}$. The encoding without wildcards (Equations 1-9) is built using $G_p^E$ instead of $G_p$, with the following changes:

Node isomorphism clauses. The any-single-node wildcards added to replace each any-1+-sequence wildcard $w \in V_p^{S+}$, with the exception of $w^1$, are optional, and thus must be excluded from the node isomorphism clauses from Equation 8 as follows:

$$\bigwedge_{v_p \in V_p^E \setminus \cup_{w \in V_p^S+} V_p^E(w)} (o_{v_p}) \wedge \bigwedge_{w \in V_p^{S+}} (o_{w^1}) \wedge \bigwedge_{v_f \in V_f} \left( \bigvee_{v_p \in V_p^E} m_{v_p,v_f} \right). \text{(Equation 11)}$$

Edge isomorphism clauses. Analogously, for each wildcard $w \in V_p^{S+}$, the edges in $E_p^{Eall}(w)$, with the exception of those in $E_p^{Ein}(w)$, are optional, and thus must be excluded from the edge isomorphism clauses from Equation 9 as follows:

$$\bigwedge_{(n_n, v_p) \in E_p^E \setminus \cup_{v \in V_p^{S+}}(E_p^{Eall}(w) \setminus E_p^{Ein}(w))} (c_{u_p}, v_p) \wedge \bigwedge_{(u_f, u_f) \in E_f} \quad \text{(Equation 12)}$$

$$\bigwedge_{\substack{(n_p, n_p) \in V_p^E \times V_p^E \\ (u_p, u_p)\phi_{(u_p,u_p)}((u_f, u_f))=0}} (-m_{u_p}, u_f \vee -m_{v_p,v_f}).$$

Sequence clauses. Each node $w^i \in V_p^E(w)$ added to replace some any-1+-sequence wildcard $w \in V_p^{S+}$ can be included in the mapping only if the previous node in the sequence $w^{i+1}$ is also in the mapping:

$$\bigwedge_{w \in V_p^{S+}} \bigwedge_{\substack{w^i \in V_p^E(w) \\ i \geq 2}} (o_{w^{i-1}} \vee -o_{w^i}). \quad \text{(Equation 13)}$$

Control-flow ensurance clauses. For each edge $(u_p, v_p) \in E_p^{Eall}(w)$ added to replace some any-1+-sequence wildcard $w \in V_p^{S+}$, if the nodes $u_f, v_f \in V_f$ of some edge $(u_f, v_f) \in E_f$ are mapped to $u_p, v_p$ respectively, then the edge $(u_p, v_p)$ must be in the mapping:

$$\bigwedge_{w \in V_p^{S+}} \bigwedge_{w \in V_p^{S+}} \bigwedge_{(u_f,v_f) \in E_f} (-m_{u_p,u_f} \vee -m_{v_p,v_f} \vee c_{u_p,v_p}). \quad \text{(Equation 14)}$$

Outgoing any-1+-sequence control-flow clauses. For each outgoing edge $(w, v) \in E_p$ of some any-1+-sequence wildcard $w \in V_p^{S+}$, exactly one edge in $E_p^{Eout}(w, v)$ must be included in the mapping:

(Equation 15)

$$\bigwedge_{w \in V_p^{S+}} \bigwedge_{v \in S_p(w)} \left[ \bigvee_{(u_p,v_p) \in E_p^{out}(w,v)} (c_{u_p,v_p}) \wedge \left( \sum_{(u_p,v_p) \in E_p^{out}(w,v)} c_{u_p,v_p} \leq 1 \right) \right].$$

Additionally, each edge $(u_p, v_p) \in E_p^{Eout}(w)$ can be included in the mapping only if is the last node of the sequence in the mapping:

$$\bigwedge_{w \in V_p^{S+}} \bigwedge_{\substack{(w^i, v_p) \in E_p^{Eout}(w) \\ i \leq k-1}} \left( -c_{w^i, v_p} \vee -o_{w, i+1} \right). \quad \text{(Equation 16)}$$

Note that the choice of k must ensure that $G_p^E$, together with the aforementioned changes to the encoding, retain the same semantics as $G_p$. One (naive) solution is to set $k=|V_f|$. Moreover, for the sake of simplicity, the encoding, as described here, assumes that $G_p$ does not contain edges between any-1+-sequence wildcards. The expansion of such wildcard nodes is actually an iterative process. Therefore, an edge $(w, w') \in E_p$ between two any-1+-sequence wildcards w and w' ends up being replaced by k $(w^i, w'^1)$ edges from each node $w^i \in V_p^E(w)$ to the first any-single-node $w'^1$ introduced to replace w'.

Sequence of zero or more nodes: an any-0+-sequence wildcard $w \in V_p$ is very similar to an any-1+-sequence wildcard, the difference being that the first allows the scenario in which no node from $V_f$ is mapped to w. To support this, the node w must be replaced by new nodes and edges as described above with respect to the sequence of one or more nodes wildcard, plus an extra set of edges from each predecessor $u_p$ of w to the successors of w, i.e., an edge $(u_p, v_p)$ for each $v_p \in S_p(w)$. The respective edge constraints $\phi_{(u_p,v_p)}$ are set to $\phi_{(u_p,w)}$. We use $E_p^{Eskip}(u_p, w)$ to denote the set of all edges added from $u_p$ to the nodes in $S_p(w)$. Additionally, we use $P_p(w) \subset V_p$ to denote the set of all predecessor nodes of w in $G_p$, i.e., $P_p(w)=\{v \in V_p:(u,v) \in E_p \wedge v=w\}$, and $E_p^{Eskip}(w)$ to denote the union of all sets $E_p^{Eskip}(u_p, w)$ such that $u_p$ is a predecessor of w, i.e., $E_p^{Eskip}(w) = \bigcup_{u_p \in P_p(w)} E_p^{Eskip}(u_p, w)$. Lastly, we use $E_p^{Eall}(w)$ to denote all edges added to $E_p^E$ when replacing w, i.e., $E_p^{Eall}(w) = E_p^{Ein}(w) \cup E_p^{Emid}(w) \cup E_p^{Eskip}(w) \cup E_p^{Eout}(w)$.

Let $V_p^{S*} \subseteq V_p$ denote the subset of all any-0+-sequence wildcards in $V_p$, and $V_p^S \subseteq V_p$ denote the set of all sequence wildcards in $v_p$, i.e., $v_p^S = V_p^{S*} \cup V_p^{S+}$ the encoding described above with respect to the sequence of one or more nodes can be adapted to support any-0+-sequence wildcards by replacing $V_p^{S+}$ with $V_p^S$ in Equation 13, Equation 14, and Equation 16, plus the following changes:

Node isomorphism clauses. The any-single-node wildcards added to replace each any-0+-sequence wildcard $w \in V_p^{S+}$ are optional and thus must be excluded from the node isomorphism clauses from Equation 11 as follows:

$$\bigwedge_{v_p \in V_p^E \cup_{w \in V_p^S} V_p^E(w)} (o_{v_p}) \wedge \bigwedge_{w \in V_p^{S+}} (o_{w^1}) \wedge \bigwedge_{v_f \in V_f} \left( \bigvee_{v_p \in V_p^E} m_{v_p, v_f} \right). \quad \text{(Equation 17)}$$

Edge isomorphism clauses. For each any-0+-sequence wildcard $w \in V_p^{S*}$, all edges in $E_p^{Eall}(w)$ are optional and thus must be excluded from the edge isomorphism clauses from Equation 12 as follows:

$$\bigwedge_{u_p, v_p \in E_p^E \left( \bigcup_{w \in V_p^S} E_p^{Eall}(w) \cup \bigcup_{w \in V_p^{S+}} E_p^{Ein}(w) \right)} (c_{u_p, v_p}) \wedge \quad \text{(Equation 18)}$$

$$\bigwedge_{(u_f, v_f) \in E_f} \bigwedge_{\substack{(u_p, v_p) \in V_p^E \times V_p^E \\ (u_p, v_p) \notin E_p^E \vee \phi_{(u_p, v_p)}((u_f \cdot v_f))=0}} \left( -m_{u_p, u_f} \vee -m_{v_p, v_f} \right).$$

Outgoing any-0+-sequence control-flow clauses. For each successor node $v \in S_p(w)$ of some any-0+-sequence wildcard $w \in V_p^{S*}$, if $w^1$ is in the mapping, then at least one edge in $E_p^{Eout}(w, v)$ must be included in the mapping:

$$\bigwedge_{w \in V_p^{S+}} \bigwedge_{v \in S_p(w)} \left( -o_{w^1} \vee \bigvee_{(u_p, v_p) \in E_p^{Eout}(w, v)} c_{u_p, v_p} \right). \quad \text{(Equation 19)}$$

On the other hand, if $w^1$ is not in the mapping, then, for each predecessor node $u \in P_p(w)$, at least one edge in $E_p^{Eskip}(u, w)$ must be included in the mapping:

$$\bigwedge_{w \in V_p^{S*}} \bigwedge_{v \in P_p(w)} \left( -o_{w^1} \vee \bigvee_{(u_p, v_p) \in E_p^{Eskip}(u, w)} c_{u_p, v_p} \right). \quad \text{(Equation 20)}$$

Lastly, for each successor node $v \in S_p(w)$, at most one edge in $E_p^{Eout}(w, v) \cup E_p^{Eskip}(u, w)$ can be in the mapping:

$$\bigwedge_{w \in V_p^{S*}} \bigwedge_{u \in P_p(w)} \bigwedge_{v \in S_p(w)} \left( \sum_{(u_p, v_p) \in E_p^{Eout}(w, v) \cup E_p^{Eskip}(u, w)} c_{u_p, v_p} \leq 1 \right). \quad \text{(Equation 21)}$$

Note that, as with the sequence of one or more nodes wildcard, for the sake of simplicity, the encoding described here assumes that $G_p$ does not contain an edge $(w, w')$ from an any-0+-sequence wildcard w to another sequence wildcard w'. In practice, as described for any-1+-sequence wildcards, the edge $(w, w')$ is replaced by k $(w^i, w'^1)$ edges from each node $w^i \in V_p^E(w)$ to the first any-single-node $w'^1$ introduced to replace w'. Because w is an any-0+-sequence wildcard, an additional edge $(u, w'^1)$ must be added for each predecessor node $u \in P_p(w)$. If u is a sequence wildcard as well, further edges must be added from the respective any-single-node wildcards (and predecessors if u is an any-0+-sequence) to $w'^1$, and so forth.

Subgraph of one or more nodes: the semantics of an any-1+-subgraph wildcard $w \in V_p$ are similar to those of the any-1+-sequence wildcard, the difference being that the nodes in $V_f$ mapped to w can be any arbitrary graph structure. In order to support such wildcards, w is replaced by a copy of $G_f$, i.e., w is replaced by $|V_f|$ nodes, a $w^{v_f}$ node for each $v_f \in V_f$, and $|E_f|$ edges, a $(w^{u_f}, w^{v_f})$ edge for each $(u_f, v_f) \in E_f$. Note that the respective node and edge constraints are copied as well. As with the sequence of one or more nodes wildcard, we use $V_p^E(w)$ ($E_p^{Emid}(w)$) to denote the sets of all node (edge) copies created to replace w. Each edge $(u_p, w) \in E_p$ is replaced by $|V_f|$ edges from $u_p$ to the nodes in $V_p^E(w)$, i.e., an edge $(u_p, w^{v_f})$ for each node $w^{v_f} \in V_p^E(w)$. The respective edge constraint $\phi_{(u_p, w^{v_f})}$ is set to $\phi_{(u_p, w)}$. We use $E_p^{Ein}(u_p, w)$ to denote the set of all new edges added to replace $(u_p, w)$. Similarly, each edge $(w, v_p) \in E_p$ is replaced by $|V_f|$ edges from the nodes in $V_p^E(w)$ to $v_p$, i.e., an edge $(w^{v_f}, v_p)$ for each node $w^{v_f} \in V_p^E(w)$. The respective edge constraint $\phi_{(w',f,v_p)}$ is set to $\phi_{(w,v_p)}$. We use $E_p^{Eout}(w, v_p)$ to denote the set of all new edges added to replace $(w, v_p)$.

Let $V_p^{G+} \subseteq V_p$ denote the subset of all any-1+-subgraph wildcards in $V_p$, and $V_p^W$ the set of all wildcards (except any-single node) in $V_p$, i.e., $V_p^W = V_p^S \cup V_p^{G+}$. The encoding described above with respect to the sequence of zero or more nodes can be adapted to support any-1+-subgraph wildcards by replacing $V_p^S$ with $V_p^W$ in Equation 17 and Equation 18, plus the following new clauses:

Any-1+-subgraph inclusion clauses. For each any-1+-subgraph wildcard $w \in V_p^{G+}$, at least one node in $V_p^E(w)$ must be included in the mapping:

$$\bigwedge_{w \in V_p^{G+}} \left( \bigwedge_{v_p \in V_p^E(w)} o_{v_p} \right). \quad \text{(Equation 22)}$$

Incoming any-1+-subgraph control-flow clauses. For each incoming edge $(u, w) \in E_p$ of some any-1+-subgraph wildcard $w \in V_p^{G+}$, at least one edge in $E_p^{Ein}(u, w)$ must be included in the mapping:

$$\bigwedge_{w \in V_p^{G+}} \bigwedge_{u \in P_p(w)} \left( \bigvee_{(u_p, v_p) \in E_p^{Ein}(u,w)} c_{u_p, v_p} \right). \quad \text{(Equation 23)}$$

Outgoing any-1+-subgraph control-flow clauses. For each outgoing edge $(u, w) \in E_p$ of some any-1+-sequence wildcard $w \in V_p^{S+}$, at least one edge in $E_p^{Eout}(w, v)$ must be included in the mapping:

$$\bigwedge_{w \in V_p^{G+}} \bigwedge_{v \in S_p(w)} \left( \bigvee_{(u_p, v_p) \in E_p^{Eout}(w,v)} c_{u_p, v_p} \right). \quad \text{(Equation 24)}$$

Subgraph of zero or more nodes: just like the any-0+-sequence wildcard, the difference between an any-0+-subgraph wildcard $w \in V_p$ and an any-1+-subgraph wildcard is that the first allows the scenario in which no node from $V_f$ is mapped to w. To support this, the node w must be replaced by new nodes and edges as described with respect the subgraph of one or more nodes wildcard, plus an extra set of edges from each predecessor $u_p$ of w to the successors of w as described with respect to the sequence of zero or more nodes wildcard.

Let $V_p^{G+} \subseteq V_p$ denote the subset of all any-0+-subgraph wildcards in $V_p$, and $V_p^G \subseteq V_p$ the set of all subgraph wildcards in $V_p$, i.e., $V_p^G = V_p^{G+} \cup V_p^{G*}$. The encoding described above with respect to the subgraph of one or more nodes can be adapted to support any-0+-subgraph wildcards by redefining the set $V_p^W$ of all wildcards (except any-single-node) to be $V_p^W = V_p^S \cup V_p^G$ and by adding the following clauses:

Outgoing any-0+-subgraph control-flow clauses. For each successor node $v \in S_p(w)$ of some any-0+-subgraph wildcard $w \in V_p^{G*}$, if a node $w^{v_f} \in V_p^E(w)$ is in the mapping, then at least one edge in $E_p^{Eout}(w, v)$ must be included in the mapping:

$$\bigwedge_{w \in V_p^{G*}} \bigwedge_{w^{v_f} \in V_p^E(w)} \bigwedge_{v \in S_p(w)} \left( -o_{w^{v_f}} \vee \bigvee_{(u_p, v_p) \in E_p^{Eout}(w,v)} c_{u_p, v_p} \right). \quad \text{(Equation 25)}$$

On the other hand, if none of the $w^{v_f} \in V_p^E(w)$ nodes are in the mapping, then, for each predecessor node $u \in P_p(w)$, at least one edge in $E_p^{Eskip}(u, w)$ must be included in the mapping:

$$\bigwedge_{w \in V_p^{S+}} \bigwedge_{u \in P_p(w)} \left( \bigwedge_{w^{v_f} \in V_p^E} o_{w^{v_f}} \vee \sum_{(u_p, v_p) \in E_p^{Eskip}(u,w)} c_{u_p, v_p} \right). \quad \text{(Equation 26)}$$

The example SAT encoding scheme described above is one example that is compatible with the search techniques disclosed herein. It is illustrative and not restrictive. Various other encodings are also possible. As described above, in various embodiments, specific adaptations and/or preprocessing steps are utilized to accommodate wildcards. The three general types of wildcards described above are single nodes, sequences, and subgraphs. The simplest case is the any single node wildcard (e.g., see FIG. 3A). This wildcard node can be mapped to any node in the comparing flow. In the example shown in FIG. 3A, the start and end nodes in search pattern 302 are mapped to the start and end nodes of code instance 310 and the any single node (node 304) is mapped to the aggregate node of the flow of code instance 310.

For the sequence of one or more nodes wildcard (e.g., see FIG. 3B), in various embodiments, pre-processing includes replacing the one or more nodes wildcard node with a sequence of any single node wildcards (the type of wildcard shown in FIG. 3A). To assure that the instance is solved correctly, a worst-case scenario can be assumed and the number of nodes in the code instance to be matched can be used to create the sequence. In the example shown in FIG. 3B, this would be four nodes because code instance 320 has four nodes. Auxiliary edges added in the pre-processing are used because not all any single node wildcards need to be mapped. In the example shown in FIG. 3B, only two of the added any single node wildcards need to be mapped (to the aggregate and assign nodes of code instance 320). The start and end nodes of search pattern 312 continue to be mapped directly to the start and end nodes of code instance 320. The pre-processing for the sequence of zero or more nodes wildcard (e.g., see FIG. 3C) is similar to the pre-processing for the sequence of one or more nodes wildcard with the only difference being that an extra edge is added from the node in the search pattern preceding the sequence of zero or more nodes wildcard to the node after the sequence of zero or more nodes wildcard to account for the possibility of zero nodes in the sequence. In the example shown in FIG. 3C, this would be an edge from the start node to the end node.

For the subgraph of one or more nodes wildcard (e.g., see FIG. 3D), in various embodiments, pre-processing includes replacing the subgraph of one or more nodes wildcard node with multiple nodes of the logic flow. To assure that the instance is solved correctly, a worst-case scenario can be assumed and the number of nodes in the code instance to be matched can be used. In the example shown in FIG. 3D, this would be six nodes because code instance 338 has six nodes. The pre-processing for the subgraph of zero or more nodes wildcard (e.g., see FIG. 3E), is similar to the pre-processing for the subgraph of one or more nodes wildcard with the only difference being that an extra edge is added from the node in the search pattern preceding the subgraph of zero or more nodes wildcard to the node after the subgraph of zero or more nodes wildcard to account for the possibility of zero nodes in the subgraph. In the example shown in FIG. 3E, this would be an edge from the start node to the end node.

FIGS. 5A-5D show examples of node and graph level constraints. With respect to node constraints, two general categories exist: single node constraints and node pair relation constraints. Graph level constraints include attribute constraints and matching constraints.

Figure 5A:
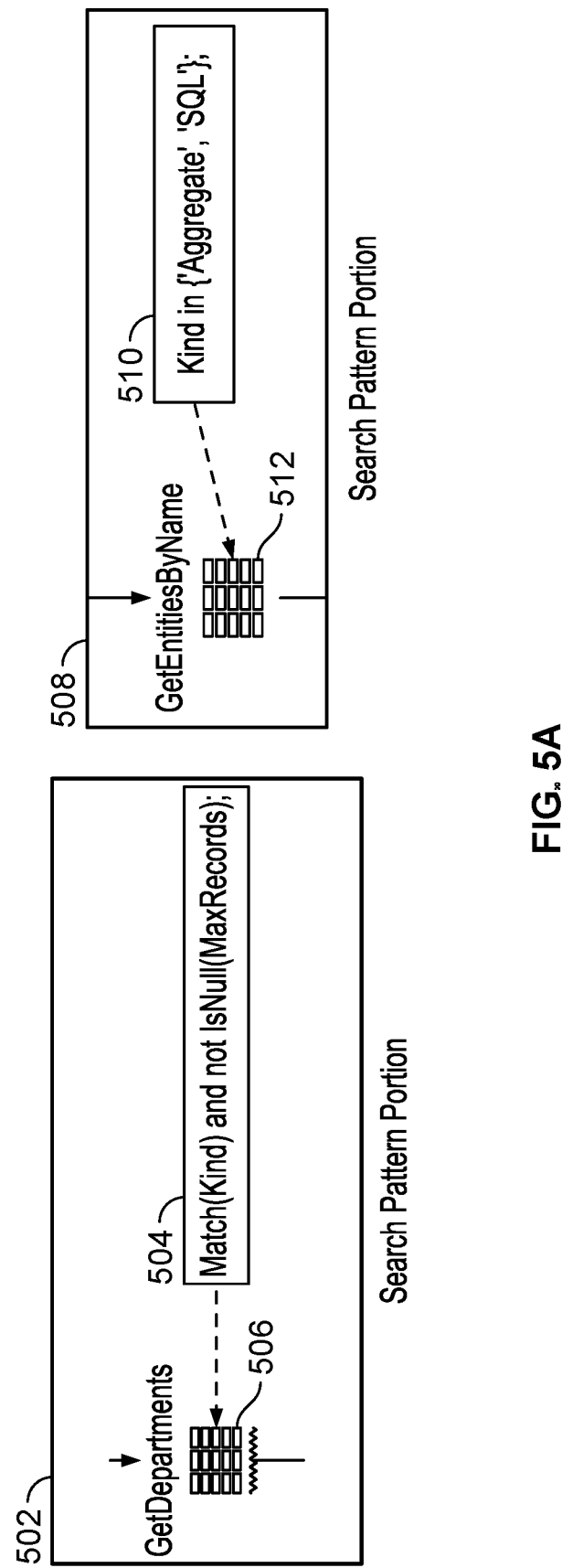
FIGS. 5A-5D show examples of node and graph level constraints.

FIG. 5A illustrates examples of single node constraints. Single node constraints are constraints over the attributes of a single node that define the space of nodes that can be matched to the single node (e.g., the node kind must be the same, the node reads/writes a variable of a specified type, or combinations of multiple constraints). In search pattern portion 502, the text of comment node 504 specifies a single node constraint in which node 506 is only allowed to match nodes of the same type that have the "MaxRecords" property set. As another example, in search pattern portion 508, the text of comment node 510 specifies a single node constraint in which node 512 is only allowed to match Aggregate or SQL nodes. The examples shown are illustrative and not restrictive. Various other constraints can be specified in various manners (e.g., using disjunctions, conjunctions, logic formulas, etc.).

Figure 5B:
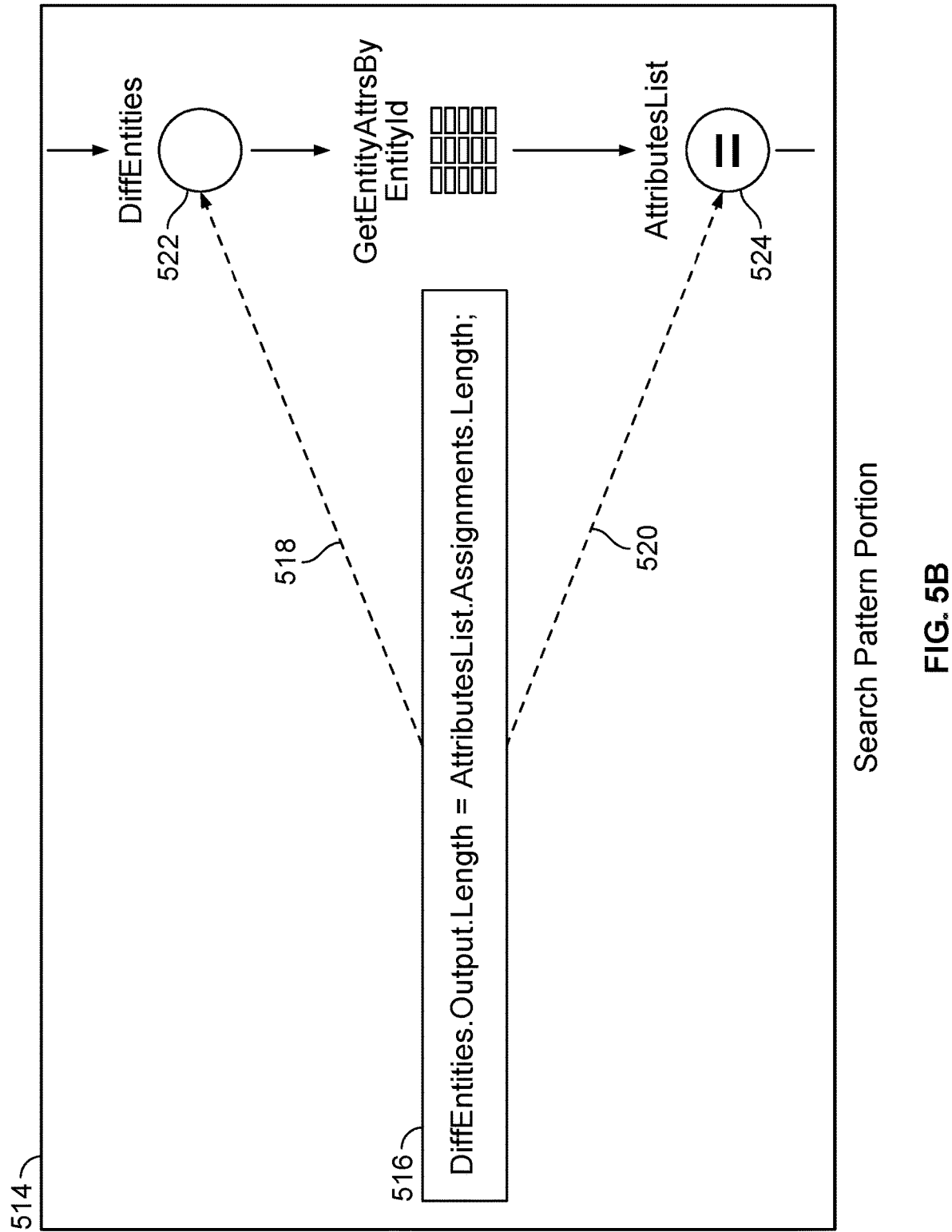

FIG. 5B illustrates an example of a node pair relation constraint. Node pair relation constraints are constraints over a node pair X, Y that must be satisfied by the nodes matched to X and Y (e.g., a node matched to X must read from the variable written by the node matched to Y). In search pattern portion 514, comment node 516 is connected to two edges (edges 518 and 520) because the constraint specified is applicable to a pair of nodes (nodes 522 and 524). Attributes of nodes can be referenced through fully qualified names, as in typical object-oriented languages. Stated alternatively, an attribute A of a node X would be referenced using "X.A" notation. In the example shown, the text of comment node 516 specifies that the number of outputs ("Output.Length") of node 522 ("DiffEntities") must be the same as the number of assignments ("Assignments.Length") of node 524 ("AttributesList").

Figure 5C:
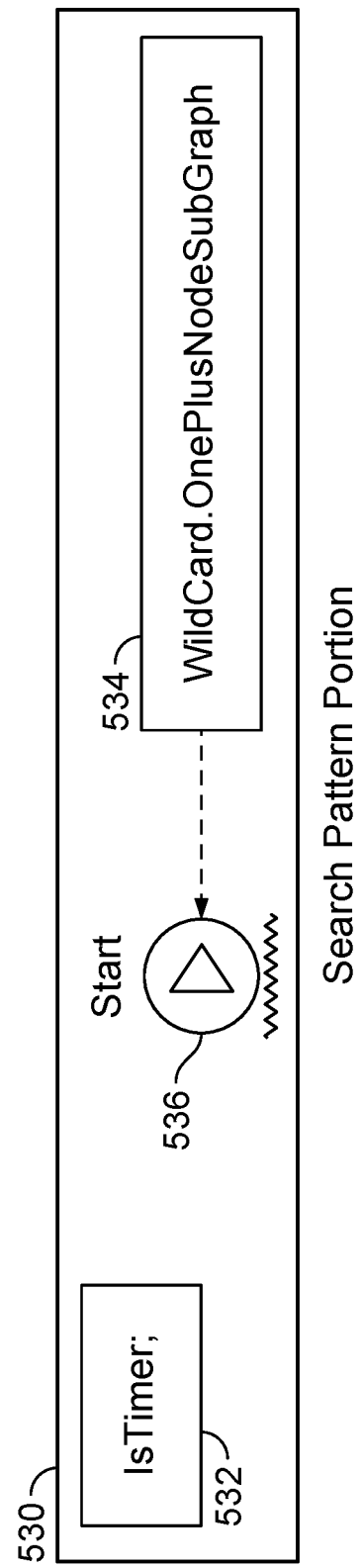

FIG. 5C illustrates an example of a graph level attribute constraint. Graph level attribute constraints restrict the space of graphs that a search pattern can match. Examples include determining whether a graph is a timer or if it has a specific flow kind. In the example shown, search pattern portion 530 includes graph constraint 532. Graph constraint 532 does not attach to any node through an edge because it is a graph level constraint, as opposed to comment node 534, which is applicable to node 536. In the example shown, graph constraint 532 specifies that the matching graph must be a timer (a kind of graph).

Figure 5D:
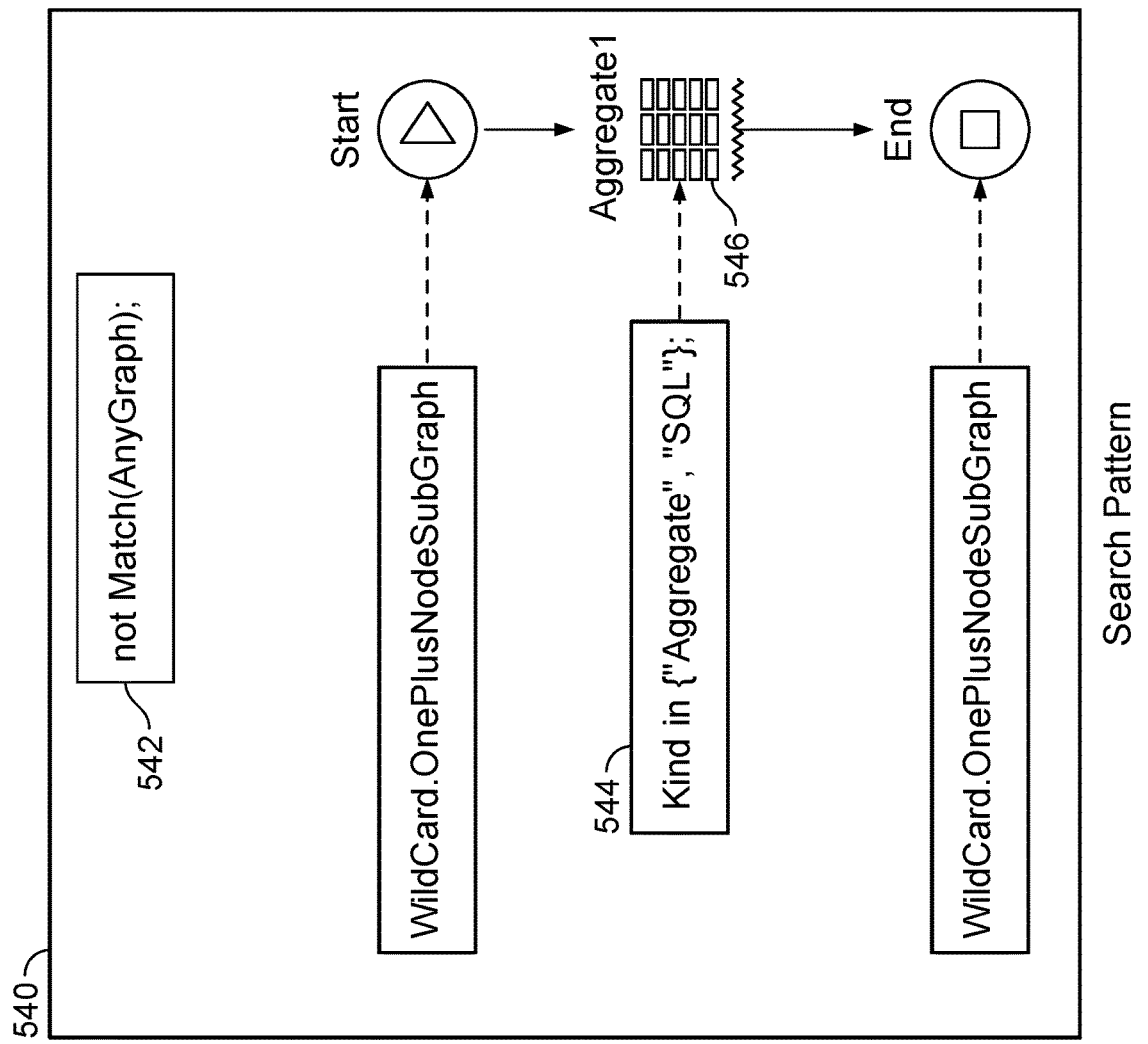

FIG. 5D illustrates an example of a graph level matching constraint. Graph level matching constraints specify how matching should be performed. For example, a search pattern could include multiple independent components, and matching constraints could be used to specify that a graph matches a search pattern if the graph matches any (or all) of the components. In the example shown in search pattern 540, graph level constraint 542 has the effect of specifying that all graphs that do not comprise either Aggregate or SQL nodes are matched. This is because comment node 544 requires node 546 to be of kind Aggregate or SQL, but graph level constraint 542 has a negation ("not") applied to a match any graph requirement. Various other graph level constraints are also possible. For example, constraints that are applicable to multiple nodes can be specified at the graph level in order to avoid repeating such constraints at the node level.

Figure 6:
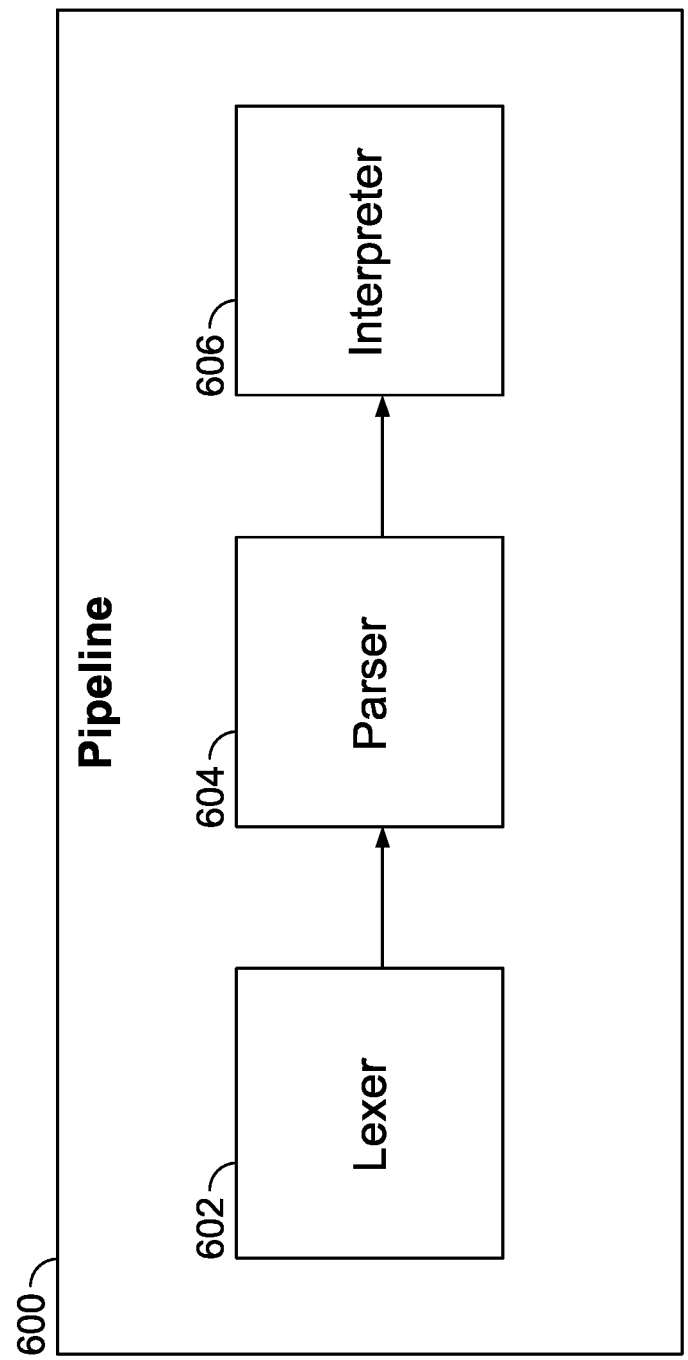
FIG. 6 is a block diagram illustrating an embodiment of a pipeline for parsing and interpreting programs written in a graph matching language.

FIG. 6 is a block diagram illustrating an embodiment of a pipeline for parsing and interpreting programs written in a graph matching language. To determine whether a code instance matches a search pattern, nodes from the code instance must be compared to nodes of the search pattern to determine whether nodes of the code instance map to nodes of the search pattern in a manner that causes the code instance to match the search pattern. In the example illustrated, pipeline 600 includes lexer 602, parser 604, and interpreter 606.

In various embodiments, lexer 602 converts a node description into a sequence of tokens based on a language known to lexer 602 and knowledge of what tokens exist in the language. For example, the text of a comment node may include "Match(Kind); not IsNull(MaxRecords)", which means that lexer 602 must convert this description into a sequence of tokens (e.g., "ID<'Match'>(ID<'Kind'>); NOT ID<'IsNull'>(ID<'MaxRecords'>);" or another suitable token representation.

In various embodiments, parser 604 relies on the syntactic structure of the language known to lexer 602 to convert the sequence of tokens created by lexer 602 to an abstract syntax tree. With respect to the example above, the sequence of tokens includes two constraints (Match(Kind) and not IsNull (MaxRecords), which translates to a syntax tree with two main branches (one for each constraint). Within each branch of the syntax tree, various sub-branches are utilized to parse the arguments and names involved with each corresponding constraint.

In various embodiments, interpreter 606 determines whether a reference node matches a target node based on the syntax tree generated by parser 604, the reference node, and the target node. Interpreter 606 can determine that the target node matches the reference node if each constraint in the syntax tree is satisfied, which can be determined by mapping properties of the target node to the various properties (e.g., arguments and names) in sub-branches of the syntax tree associated with each constraint. The reference node does not match with the target node if at least one constraint is not satisfied.

Figure 7:
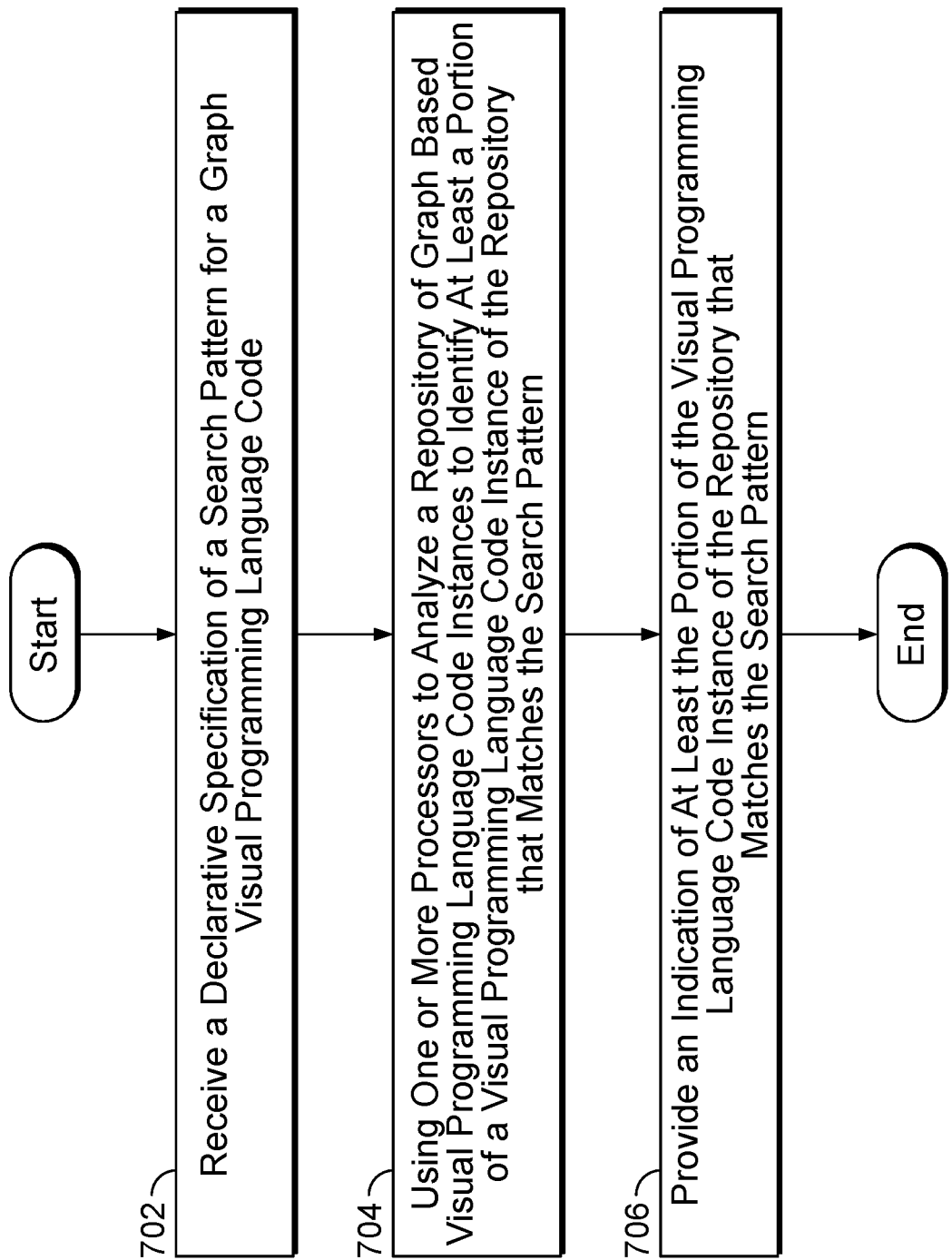
FIG. 7 is a flow chart illustrating an embodiment of a process for matching search patterns to visual programming language code instances.

FIG. 7 is a flow chart illustrating an embodiment of a process for matching search patterns to visual programming language code instances. In some embodiments, the process of FIG. 7 is performed by system 200 of FIG. 2A.

At 702, a declarative specification of a search pattern for a graph visual programming language code is received. In some embodiments, the declarative specification of the search pattern is received from a user via visual modeling environment 201 of FIG. 2A. In various embodiments, the search pattern is inputted visually using the same interface and specified in the same graph visual programming language as that used for performing visual programming of code instances to be matched to the search pattern. In various embodiments, a graph based visual representation of the search pattern is provided. In some embodiments, the graph based visual representation is provided in visual modeling environment 201 of FIG. 2A.

At 704, a repository of graph based visual programming language code instances is analyzed using one or more processors to identify at least a portion of a visual programming language code instance of the repository that matches the search pattern. In various embodiments, the visual programming language code instances are programmed visually using the interface and visual programming language utilized to create the search pattern. In various embodiments, the repository of graph based visual programming language code instances is a storage in system 200 of FIG. 2A (e.g., programmatic logic flow repository 203, database 210, or a storage not shown in FIG. 2A). In some embodiments, code analysis engine 213 of FIG. 2A and/or system component 400 of FIG. 4 analyzes the repository of code instances to identify code instances that match the search pattern. In some scenarios, an entirety of a code instance is identified. It is also possible to identify a set of code instances. For example, this could be portions of multiple code instances, multiple entire code instances, or any combination thereof.

At 706, an indication of at least the portion of the visual programming language code instance of the repository that matches the search pattern is provided. The indication may be presented visually. For example, matching code instances may be presented in visual modeling environment 201, code analysis environment 211, or another visual interface of system 200 of FIG. 2A. There are various ways to provide the indication of the matching code instance. For example, the matching code instance may be highlighted, outlined, etc. In various embodiments, a user alert is provided to indicate the matching code instance.

Figure 8:
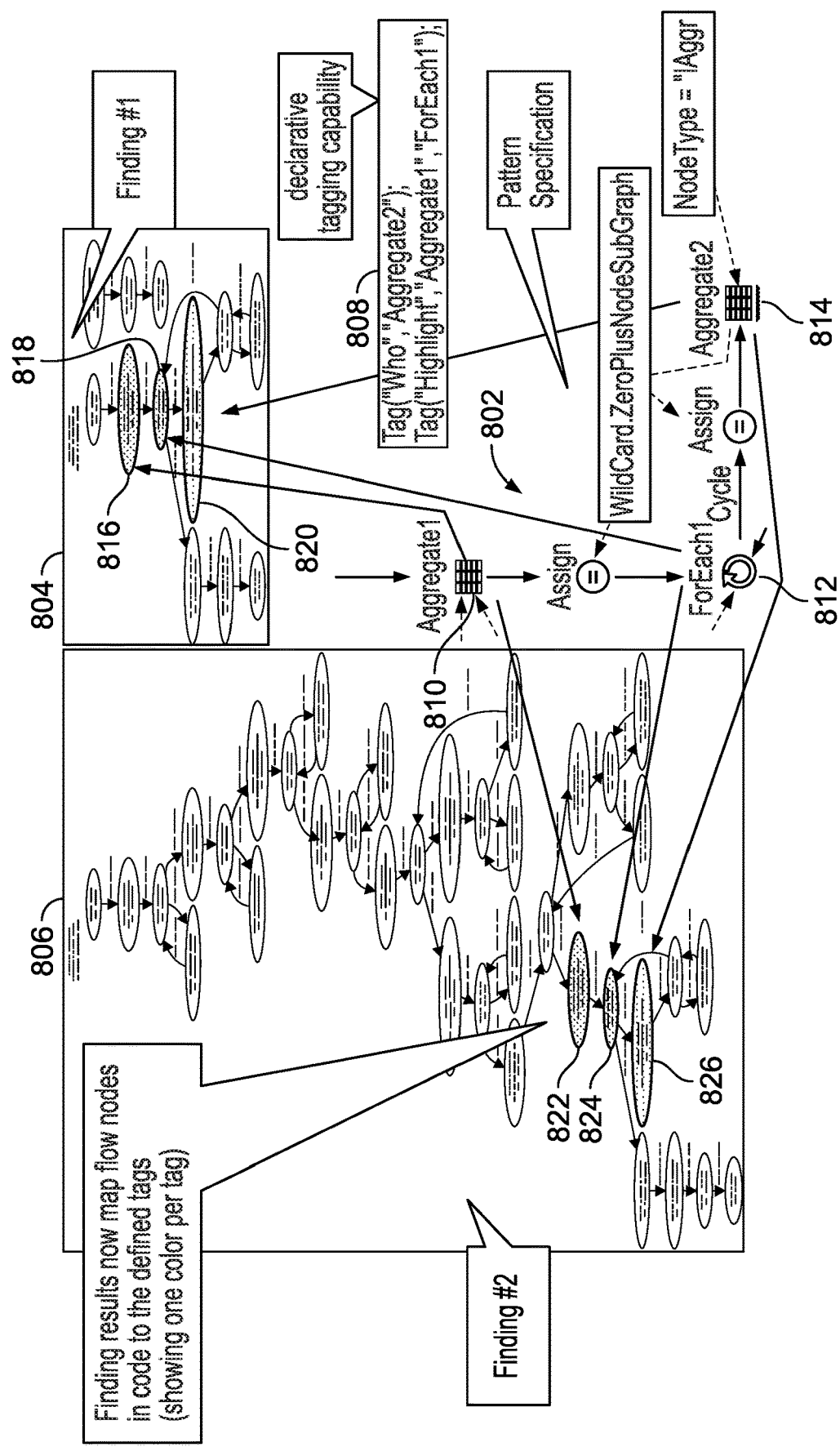
FIG. 8 is a diagram illustrating an example of detecting, tagging and highlighting specific locations in a matching code instance.

FIG. 8 is a diagram illustrating an example of detecting, tagging and highlighting specific locations in a matching code instance. In the example illustrated, search pattern 802 (a portion of which is shown) is matched to code instance 804 and code instance 806. This matching occurs in a manner as described above (e.g., using system 200 of FIG. 2A, system component 400 of FIG. 4, and/or pipeline 600 of FIG. 6). In the example illustrated, in addition to determining matching code instances, specific locations in the matching code instances are identified and tagged (each different tag highlighted in FIG. 8 with different colors for easier visualization). This is particularly useful for large flows, which are more difficult for a user to analyze than smaller flows. For example, determining how search pattern 802 maps to code instance 806 is more difficult for the user than for code instance 804 because code instance 806 is much larger than code instance 804. The tagging and respective highlighting allows for a better user experience, including faster analysis and refactoring. Different types of tags can exist in order to identify different nodes. These types of tags can further improve the experience and guide the user in the refactoring of the bad code (for example, allowing node highlights).

In the example illustrated, search pattern 802 includes specification 808 that indicates which locations in the matching code instances are to be tagged. Specification 808 is similar to the graph-level constraints described with respect to FIGS. 5C and 5D in that specification 808 is described at a level higher than the individual node level. Specification 808 indicates that nodes in the matching code instances that map to the "Aggregate1", "ForEach1", and "Aggregate2" nodes in search pattern 802 are to be identified. Also, the nodes "Aggregate1" and "ForEach1" should be identified as a different tag than the "Aggregate2" node. In search pattern 802, the "Aggregate1", "ForEach1", and "Aggregate2" nodes are nodes 810, 812, and 814, respectively. As described above (e.g., see FIG. 4), in order to detect the matching code instances, mappings from nodes in the search pattern to nodes in the matching code instances are determined. Because these mappings have already been determined as part of the matching process, this means that implementing specific identification and tagging of specific locations in a matching code instance only requires mapping pattern nodes (by name) with respective tags. In the example illustrated, nodes 810, 812, and 814 in search pattern 802 are mapped to nodes 816, 818, and 820 in code instance 804, respectively, which are then tagged to provide the highlighted nodes visible in FIG. 8. In addition, in the example illustrated, nodes 810, 812, and 814 in search pattern 802 are mapped to nodes 822, 824, and 826 in code instance 806, respectively, then tagged to provide the highlighted nodes visible in FIG. 8.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
receiving a declarative specification of a search pattern for a refactoring candidate code portion of a graph visual programming language code, wherein the declarative specification of the search pattern specifies a visual programming logic flow including a plurality of connected nodes having a wildcard node with a wildcard search specification, wherein the graph visual programming language code includes a visual representation provided by a user via a graphical user interface of a visual programming environment that is displayed to the user to allow user interaction that facilitates a visual construction and modification of the graph visual programming language code, and wherein the wildcard node represents a structural element in the visual programming logic flow having a sequence of one or more nodes or a subgraph of one or more nodes in the visual programming logic flow;
analyzing a repository of graph based visual programming language code instances to identify at least a portion of a visual programming language code instance of the repository that matches the search pattern, including by being configured to automatically map the plurality of connected nodes of the search pattern to corresponding nodes of the graph based visual programming language code instances;
providing an indication of at least the portion of the visual programming language code instance of the repository that matches the search pattern, including by being configured to identify based on the search pattern, specific nodes within the matched portion of the visual programming language code instance of the repository; and
restructuring at least the portion of the visual programming language code instance of the repository that matches the search pattern for the refactoring candidate code portion of the graph visual programming language code based on the identified specific nodes to improve graph visual programming language code quality by removing an inefficiency or a security vulnerability.

2. The method of claim 1, wherein the declarative specification of the search pattern includes a visual representation.

3. The method of claim 2, wherein the visual representation includes visual nodes and edges.

4. The method of claim 1, wherein analyzing the repository of graph based visual programming language code instances to identify at least the portion of the visual programming language code instance of the repository that matches the search pattern includes comparing a code instance of the repository with the search pattern.

5. The method of claim 4, wherein comparing the code instance of the repository with the search pattern includes determining whether the code instance of the repository maps into the search pattern.

6. The method of claim 5, wherein determining whether the code instance of the repository maps into the search pattern includes determining whether each node of the code instance of the repository maps into a corresponding node of the search pattern.

7. The method of claim 4, wherein comparing the code instance of the repository with the search pattern includes encoding a comparison of the code instance of the repository and the search pattern as a Boolean satisfiability relationship.

8. The method of claim 7, wherein the Boolean satisfiability relationship has a Conjunctive Normal Form.

9. The method of claim 7, wherein the Boolean satisfiability relationship includes Boolean variables representing nodes and edges in the code instance of the repository and nodes and edges in the search pattern.

10. The method of claim 1, wherein the wildcard search specification identifies a wildcard type for the wildcard node.

11. The method of claim 10, wherein the wildcard search specification is represented as a comment node pointing to the wildcard node acting as a placeholder to match one or more nodes in the at least the portion of the visual programming language code instance of the repository that matches the wildcard search specification.

12. The method of claim 11, wherein the comment node displays text within the comment node associated with a number of nodes able to be matched to the wildcard node.

13. The method of claim 1, wherein the wildcard node maps to a sequence of one or more nodes in the at least the portion of the visual programming language code instance of the repository that matches the search pattern.

14. The method of claim 13, further comprising converting the wildcard node to a plurality of wildcard nodes of a different type, wherein each wildcard node of the plurality of wildcard nodes of the different type is able to only map to a single node in the at least the portion of the visual programming language code instance of the repository that matches the search pattern.

15. The method of claim 1, wherein the wildcard node maps to a subgraph of one or more nodes in the at least the portion of the visual programming language code instance of the repository that matches the search pattern.

16. The method of claim 15, further comprising converting the wildcard node to a plurality of wildcard nodes of a different type, wherein each wildcard node of the plurality of wildcard nodes of the different type is able to only map to a single node in the at least the portion of the visual programming language code instance of the repository that matches the search pattern.

17. The method of claim 1, wherein the search pattern includes a constraint over an attribute of a specific node in the search pattern, and wherein the constraint restricts a space of nodes that is allowed to be matched to the specific node in the search pattern.

18. The method of claim 1, wherein the search pattern includes a constraint over the search pattern as a whole, and wherein the constraint restricts a space of graphs that the search pattern is allowed to match.

19. A system, comprising:
one or more processors configured to:
receive a declarative specification of a search pattern for a refactoring candidate code portion of a graph visual programming language code, wherein the declarative specification of the search pattern specifies a visual programming logic flow including a plurality of connected nodes having a wildcard node with a wildcard search specification, wherein the graph visual programming language code includes a visual representation provided by a user via a graphical user interface of a visual programming environment that is displayed to the user to allow user interaction that facilitates a visual construction and modification of the graph visual programming language code, and wherein the wildcard node represents a structural element in the visual programming logic flow having a sequence of one or more nodes or a subgraph of one or more nodes in the visual programming logic flow;
analyze a repository of graph based visual programming language code instances to identify at least a portion of a visual programming language code instance of the repository that matches the search pattern, including by being configured to automatically map the plurality of connected nodes of the search pattern to corresponding nodes of the graph based visual programming language code instances;
provide an indication of at least the portion of the visual programming language code instance of the repository that matches the search pattern, including by being configured to identify based on the search pattern, specific nodes within the matched portion of the visual programming language code instance of the repository; and
restructure at least the portion of the visual programming language code instance of the repository that matches the search pattern for the refactoring candidate code portion of the graph visual programming language code based on the identified specific nodes to improve graph visual programming language code quality by removing an inefficiency or a security vulnerability; and
a memory coupled to at least one processor of the one or more processors and configured to provide at least one processor of the one or more processors with instructions.

20. A method, comprising:
receiving a declarative specification of a search pattern for a refactoring candidate code portion of a graph of data elements, wherein the declarative specification of the search pattern specifies a visual programming logic flow including a plurality of connected nodes having a wildcard node with a wildcard search specification, wherein the graph of data elements includes a visual representation provided by a user via a graphical user interface of a visual programming environment that is displayed to the user to allow user interaction that facilitates a visual construction and modification of the graph of data elements, and wherein the wildcard node represents a structural element in the visual programming logic flow having a sequence of one or more nodes or a subgraph of one or more nodes in the visual programming logic flow;
analyzing a repository of graph instances to identify at least a portion of a graph instance of the repository that matches the search pattern, including by being configured to automatically map the plurality of connected nodes of the search pattern to corresponding nodes of the graph instances;
providing an indication of at least the portion of the graph instance of the repository that matches the search pattern, including by being configured to identify based on the search pattern, specific nodes within the matched portion of the graph instance of the repository; and restructuring at least the portion of the graph instance of the repository that matches the search pattern for the refactoring candidate code portion of the graph of data elements based on the identified specific nodes to improve code quality by removing an inefficiency or a security vulnerability.

\* \* \* \* \*